(12) United States Patent
Hwang et al.

(10) Patent No.: US 9,716,989 B2
(45) Date of Patent: Jul. 25, 2017

(54) MOBILE TERMINAL AND METHOD FOR CAPTURING A SCREEN AND EXTRACTING INFORMATION TO CONTROL THE SAME

(71) Applicant: Samsung Electronics Co., Ltd., Suwon-si, Gyeonggi-do (KR)

(72) Inventors: Sunmin Hwang, Hwaseong-si (KR); Myungsu Kang, Seoul (KR); Jungwoo Lee, Suwon-si (KR); Jaewan Cho, Suwon-si (KR); Soonhyun Cha, Anyang-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 46 days.

(21) Appl. No.: 14/296,981

(22) Filed: Jun. 5, 2014

(65) Prior Publication Data
US 2014/0364158 A1 Dec. 11, 2014

(30) Foreign Application Priority Data

Jun. 10, 2013 (KR) .......................... 10-2013-0065646

(51) Int. Cl.
*H04W 4/12* (2009.01)
*H04W 4/18* (2009.01)
*H04M 1/725* (2006.01)
*G06F 17/30* (2006.01)

(52) U.S. Cl.
CPC ...... *H04W 4/185* (2013.01); *G06F 17/30887* (2013.01); *H04M 1/72561* (2013.01); *H04W 4/12* (2013.01)

(58) Field of Classification Search
CPC ... H04W 4/185; H04W 4/12; G06F 17/30887; H04M 1/72561

USPC .......................................................... 455/566
See application file for complete search history.

(56) References Cited

U.S. PATENT DOCUMENTS

| 6,119,135 A * | 9/2000 | Helfman ........... G06F 17/30873 707/E17.111 |
| 2005/0114545 A1* | 5/2005 | Gopalan ........... G06F 17/30884 709/245 |
| 2007/0239844 A1* | 10/2007 | Yokoyama et al. .......... 709/217 |
| 2009/0111374 A1* | 4/2009 | Lee .............................. 455/3.06 |

(Continued)

FOREIGN PATENT DOCUMENTS

| KR | 10-2008-0006129 A | 1/2008 |
| KR | 10-2009-0000684 A | 1/2009 |

OTHER PUBLICATIONS

Netsu Takashi, Toshiba's Hi8 Camera/Recorder Serves in Professional Applications, JEE Journal of Electronic Engineering, Jan. 1, 1991, pp. 23-24, vol. 28, DEMPA Publications, Inc., Tokyo, Japan.

*Primary Examiner* — Marisol Figueroa
(74) *Attorney, Agent, or Firm* — Jefferson IP Law, LLP

(57) ABSTRACT

A mobile terminal for storing supplementary information together with a captured screen when the mobile terminal captures a screen displayed on a display unit, and a controlling method thereof is provided. The method of controlling a mobile terminal including a display unit includes capturing a screen of a process displayed on the display unit, extracting supplementary information associated with the process displayed on the display unit, and storing the extracted supplementary information together with the captured screen, as a captured image.

20 Claims, 24 Drawing Sheets

(56) References Cited

U.S. PATENT DOCUMENTS

| 2009/0199106 A1* | 8/2009 | Jonsson et al. ............... 715/744 |
| 2011/0219303 A1* | 9/2011 | Forstall ............... G06F 3/04817 715/702 |
| 2013/0080531 A1* | 3/2013 | Yoon ................ G06F 17/30058 709/204 |
| 2013/0104032 A1* | 4/2013 | Lee et al. ..................... 715/234 |

* cited by examiner

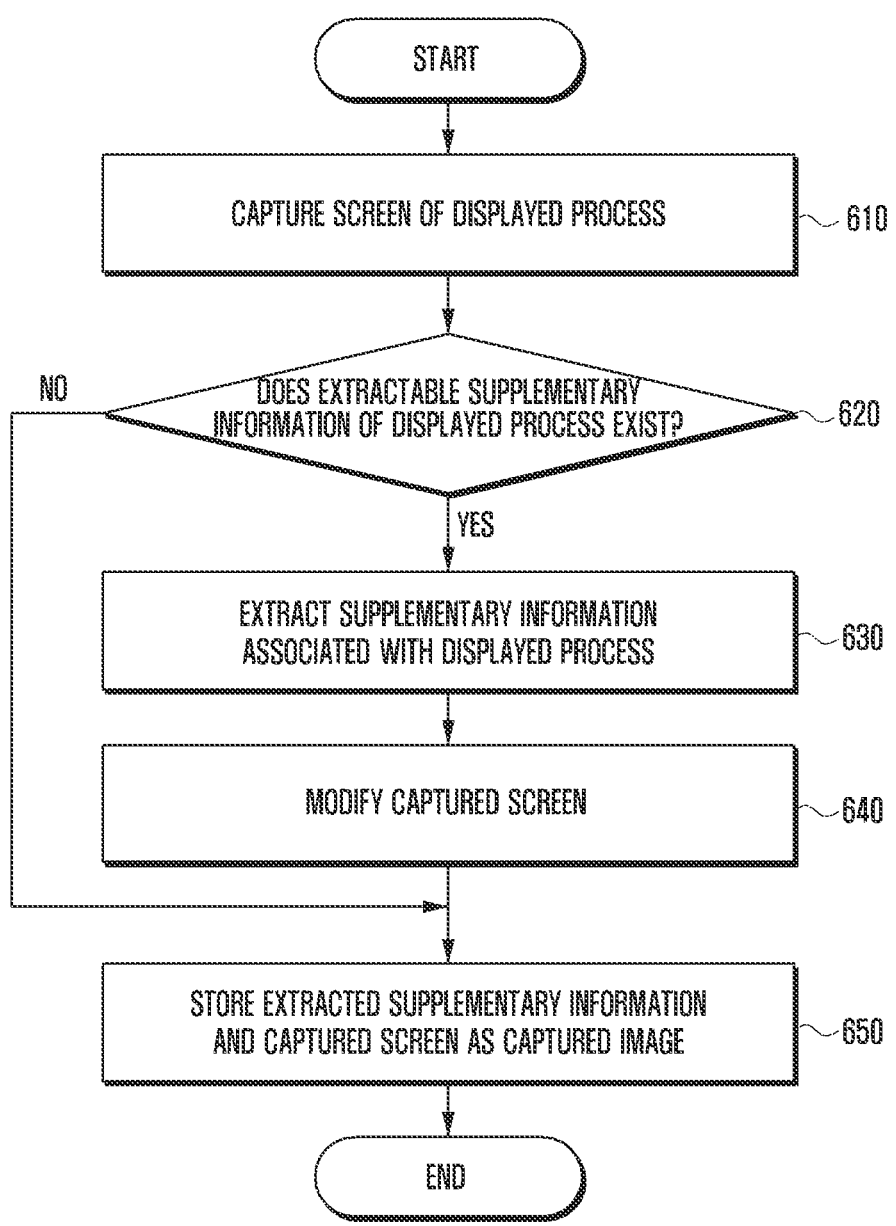

MOBILE TERMINAL AND METHOD FOR CAPTURING A SCREEN AND EXTRACTING INFORMATION TO CONTROL THE SAME

CROSS-REFERENCE TO RELATED APPLICATION(S)

This application claims the benefit under 35 U.S.C. §119(a) of Korean patent application filed on Jun. 10, 2013 in the Korean Intellectual Property Office and assigned Serial number 10-2013-0065646, the entire disclosure of which is hereby incorporated by reference.

TECHNICAL FIELD

The present disclosure relates to a mobile terminal for storing supplementary information together with a captured screen when the mobile terminal captures a screen displayed on a display unit, and a control method thereof.

BACKGROUND

Terminals may be classified based on mobility into a mobile/portable terminal and a stationary terminal. Again, the mobile terminals may further be classified into a hand-held terminal and a vehicle mounted terminal based on whether it is carried directly by a user or mounted in a vehicle.

As the functions of these terminals have been diversified, the terminal has been embodied in a form of a multimedia player which provides complex functions such as taking a photograph or a video, playing back a music file or video file, playing a game, receiving broadcasting signals, and the like.

To support or increase the functions of the terminal, improvements to the structure and/or software of the terminal has been considered.

While a process is executed in the mobile terminal, a user may desire to share information associated with the executed process with another user.

FIGS. 1A and 1B illustrate examples of sharing information of a mobile terminal according to the related art.

Referring to FIG. 1A, a user of a first mobile terminal 11 may wish to share, with another user, information associated with a web page while web surfing. In this case, the user of the first mobile terminal 11 may transmit a Uniform Resource Locator (URL) 12 of a corresponding web page to a second mobile terminal, by selecting an application such as a message, an SNS, an e-mail, and the like.

In this example, through only the URL address, the user of the second mobile terminal 15 that receives the URL 12 may not be intuitively aware of the content of the web page corresponding to the URL. Therefore, after opening the corresponding URL address, the user of the second terminal 15 may become aware of the content.

Also, although the user of the second mobile terminal 15 opens the corresponding URL, the corresponding web page may be opened from the beginning part as illustrated in FIG. 1B.

Therefore, the user of the second mobile terminal 15 may not be intuitively aware of information associated with a part of the corresponding web page that the user of the first mobile terminal 11 wishes to share.

Therefore, even though the URL is shared, to inform of the desired information of the user, additional content may need to be transferred through a message, an SNS, a phone call, and the like.

Alternatively, although not illustrated, a user of a first mobile terminal may capture an image of a screen being displayed on a display unit while a process is executed. The user of the first mobile terminal stores the captured image and may transmit the stored captured image to a user of a second mobile terminal.

In this example, the user of the second mobile terminal views the captured image and obtains information associated with the screen in which the corresponding process is executed. However, the user of the second mobile terminal may be incapable of directly executing the process that the user of the first mobile terminal executes and thus, there is a drawback in that the user of the second mobile terminal is not concretely aware of supplementary information that the user of the first mobile terminal desires to share with the user of the second mobile terminal.

In this example, while the user of the first mobile terminal surfs the web and displays a web page in a display unit, the user of the first mobile terminal captures a displayed screen, and transmits a captured image to the user of the second mobile terminal. In this example, although the user of the second mobile terminal may obtain information associated with the content displayed on the captured screen through the captured image, the user of the second mobile terminal may not obtain information associated with a URL of the corresponding web page or other content contained in the web page.

Therefore, even though the image obtained by capturing the web page is transferred, there is a need for a motion of transmitting an additional message for informing the user of the second mobile terminal of the supplementary information such as the URL of the corresponding web page and the like.

Accordingly, providing a user of convenient supplementary information by storing, in a captured image, supplementary information that may be provided to the user for each executed process when a screen displayed on a display unit of a mobile terminal is captured is desired.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a user of convenient supplementary information by storing, in a captured image, supplementary information that may be provided to the user for each executed process when a screen displayed on a display unit of a mobile terminal is captured.

Also, a sharer that receives the captured image may intuitively recognize the intention of a sender through the captured image, and may obtain the corresponding supplementary information.

The technical subjects pursued in the present disclosure may not be limited to the above mentioned technical subjects, and other technical subjects which are not mentioned may be clearly understood, through the following descriptions, by those skilled in the art of the present disclosure.

In accordance with an aspect of the present disclosure, a method of controlling a mobile terminal including a display unit is provided. The method includes capturing a screen of a process displayed on the display unit, extracting supplementary information associated with the process displayed on the display unit, and storing the extracted supplementary information together with the captured screen, as a captured image.

In accordance with another aspect of the present disclosure, a mobile terminal is provided. The mobile terminal includes a display unit, a memory, and a controller configured to capture a screen of a process displayed on the display unit, to extract supplementary information associated with the process displayed on the display unit, and to store, in the memory, the extracted supplementary information together with the captured screen, as a captured image.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 6 is a flowchart illustrating an example of a process in which a mobile terminal generates a captured image according to another embodiment of the present disclosure;

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein may be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

A mobile terminal described in the present specifications may include a portable phone, a smart phone, a laptop computer, a digital broadcasting terminal, a Personal Digital Assistants (PDA), a Portable Multimedia Player (PMP), a navigation terminal, and the like. However, it is apparent to those skilled in the art that a configuration according to various embodiments provided in the present specifications are also applied to a stationary terminal such as a digital TV, a desktop computer, and the like, excluding a case that is only applicable to a mobile terminal.

Figure 1A:
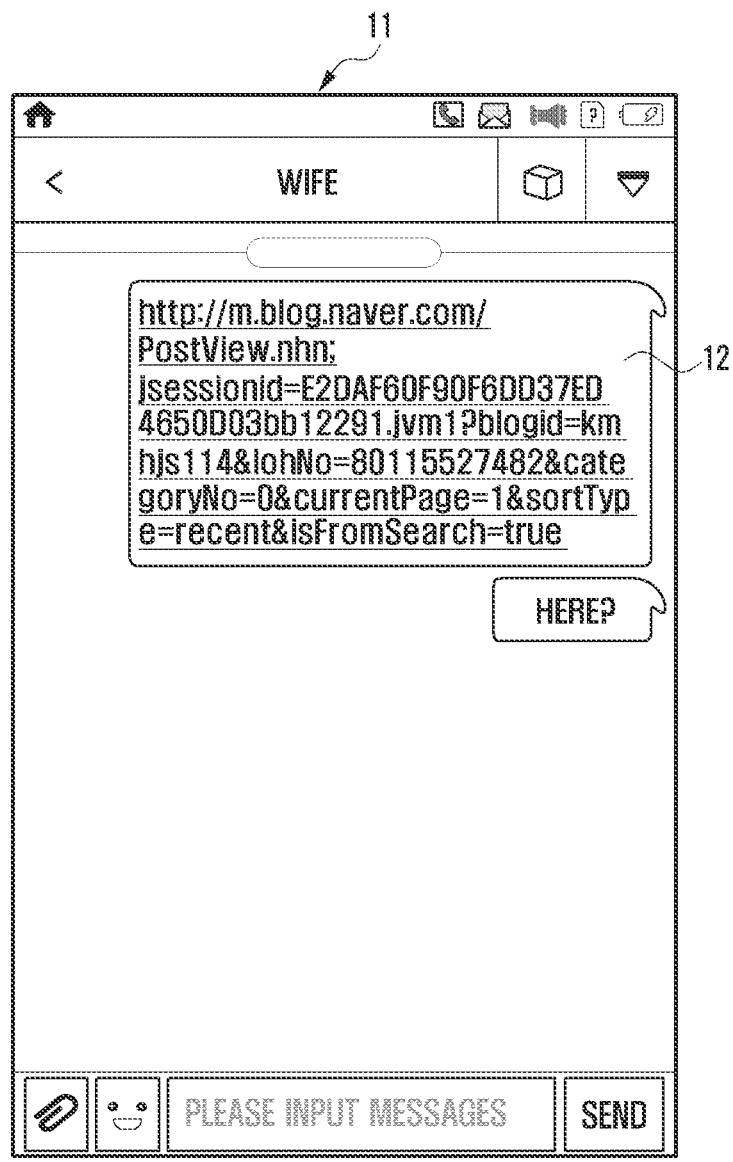
FIGS. 1A and 1B are diagrams illustrating an example of sharing information of a mobile terminal according to the related art.
Figure 1B:
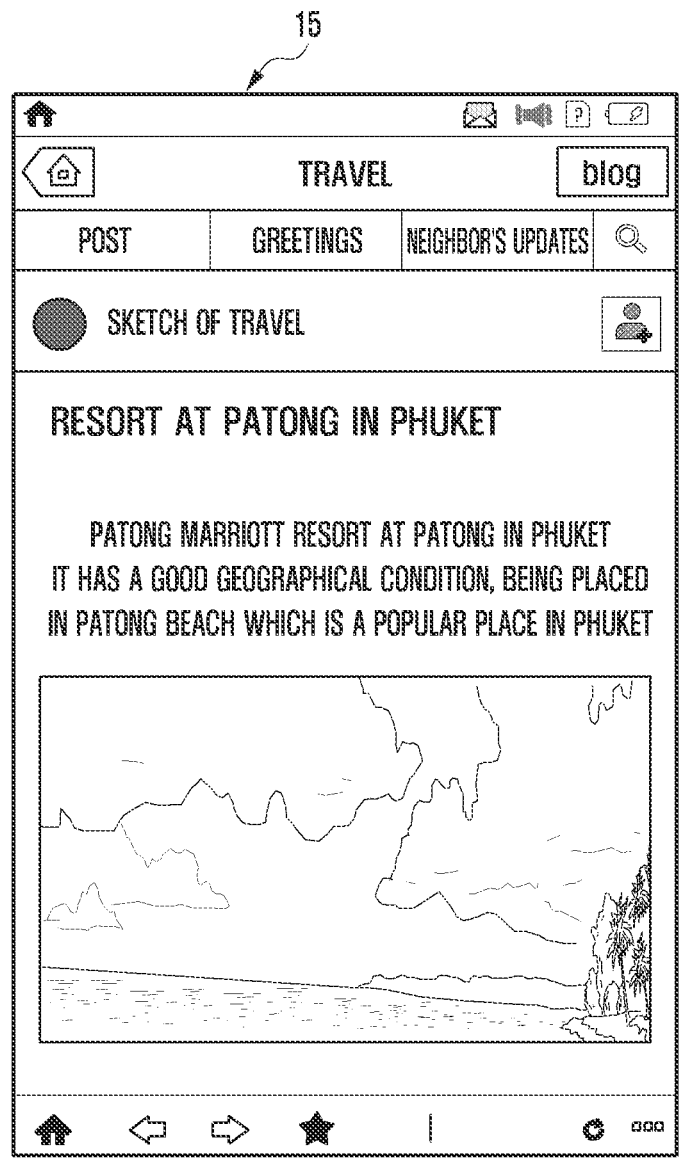
Figure 2:
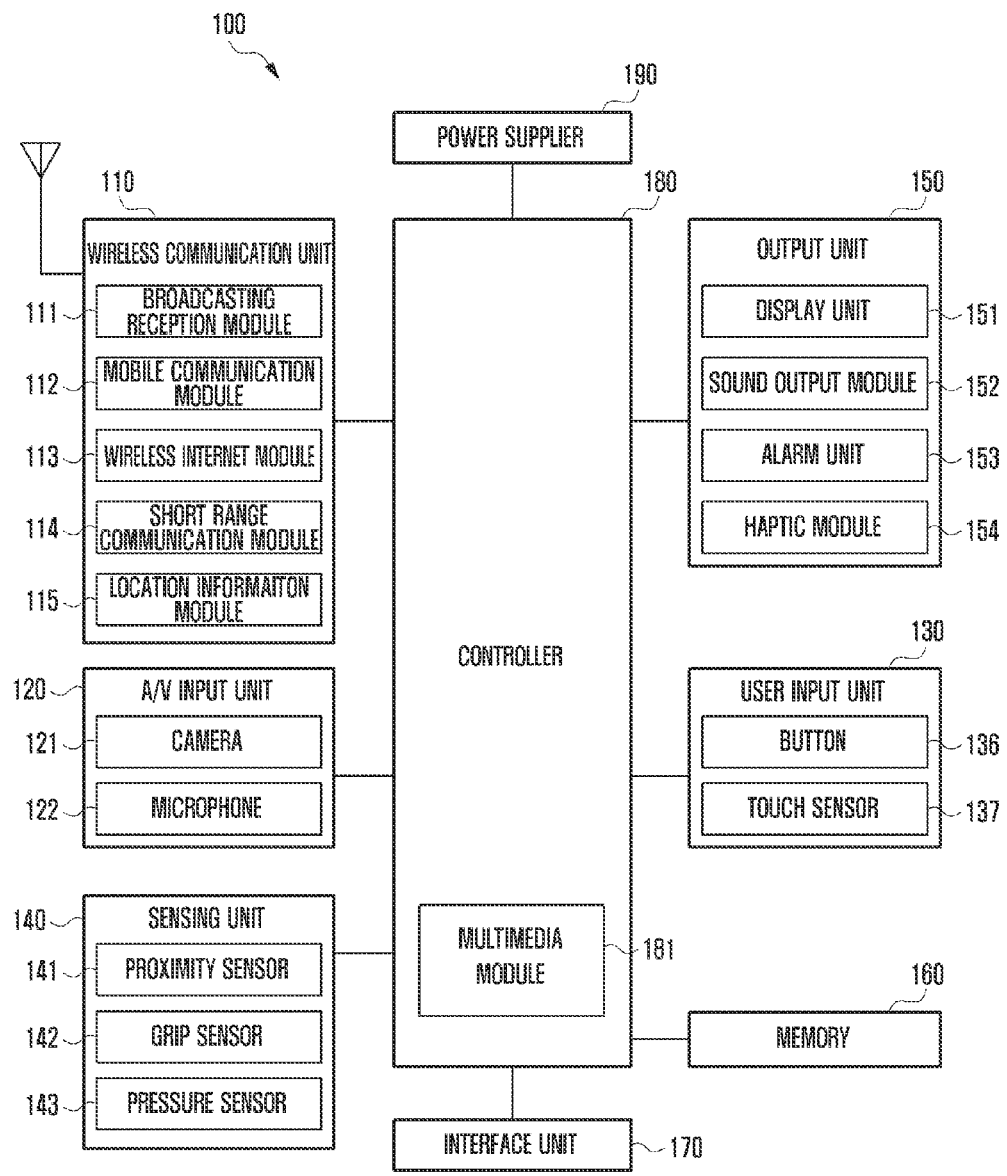
FIG. 2 is a block diagram of a mobile terminal according to an embodiment of the present disclosure.

FIG. 2 is a block diagram of a mobile terminal according to an embodiment of the present disclosure.

Referring to FIG. 2, a mobile terminal 100 may include a wireless communication unit 110, an Audio/Video (A/V) input unit 120, an user input unit 130, a sensing unit 140, an output unit 150, a memory 160, an interface unit 170, a controller 180, a power supplier 190, and the like. The component elements illustrated in FIG. 2 may not be essential and a mobile terminal that may have more component elements or fewer component elements may be embodied.

Hereinafter, the component elements will be described, sequentially.

The communication unit 110 may include one or more modules that enable wireless communication between the mobile terminal 100 and a wireless communication system or between the mobile terminal 100 and a network where the mobile terminal 100 is located. For example, the wireless communication unit 110 may include a broadcasting reception module 111, a mobile communication module 112, a wireless Internet module 113, a short range communication module 114, and a location information module 115, and the like.

The broadcasting reception module 111 may receive a broadcasting signal and/or broadcasting related information from an external broadcasting management server through a broadcasting channel. The broadcasting channel may include a satellite channel, and a terrestrial channel. To perform simultaneous broadcasting reception or broadcasting channel switching with respect to at least two broadcasting channels, two or more broadcasting reception modules may be provided to the mobile terminal 100.

The broadcasting managing server may refer to a server that generates and transmits a broadcasting signal and/or broadcasting related information, or a server that is provided with a generated broadcasting signal and/or broadcasting related information, and transmits the same to a terminal. The broadcasting signal may include a TV broadcasting signal, a radio broadcasting signal, a data broadcasting signal, and may also include a broadcasting signal in a form of combination of a TV broadcasting signal or a radio broadcasting signal and a data broadcasting signal.

The broadcasting related information refers to information associated with a broadcasting channel, a broadcasting program, or a broadcasting service provider. The broadcasting related information may be provided over a mobile communication network. In this case, the information may be received by the mobile communication module 112.

The broadcasting related information may exist in various forms. For example, the broadcasting related information may be in a form such as an Electronic Program Guide (EPG) of a Digital Multimedia Broadcasting (DMB) or an Electronic Service Guide (ESG) of a Digital Video Broadcast-Handheld (DVB-H).

The broadcasting reception module 111 may receive a digital broadcasting signal using a digital broadcasting system, for example, Digital Multimedia Broadcasting-Terrestrial (DMB-T), Digital Multimedia Broadcasting-Satellite (DMB-S), Media Forward Link Only (MediaFLO), Digital Video Broadcast-Handheld (DVB-H), Convergence of Broadcasting and Mobile Service (DVB-CBMS), Open Mobile Alliance-BroadCAST (OMA-BCAST), China Multimedia Mobile Broadcasting (CMMB), Mobile Broadcasting Business Management System (MBBMS), Integrated Services Digital Broadcast-Terrestrial (ISDB-T), and the like. The broadcasting reception module 111 may be configured to be appropriate for another broadcasting system, in addition to the described digital broadcasting system.

A broadcasting signal and/or broadcasting related information received through the broadcasting reception module 111 may be stored in the memory 160.

The mobile communication module 112 may transmit and receive a wireless signal to/from at least one of a base station, an external terminal, and a server over a mobile communication network, such as Global System for Mobile communications (GSM), Code Division Multiple Access (CDMA), and Wideband CDMA (WCDMA), but is not limited thereto. The wireless signal may include data provided in various forms as a voice call signal, a video call signal, or a text/multimedia message is transmitted and received.

The wireless Internet module 113 may refer to a module for wireless Internet connection, and may be contained inside or outside the mobile terminal 100. A Wireless LAN (WLAN), Wi-Fi, Wireless broadband (Wibro), World Interoperability for Microwave Access (Wimax), High Speed Downlink Packet Access (HSDPA), GSM, CDMA, WCDMA, Long Term Evolution (LTE), and the like may be used as a wireless Internet technology.

From a perspective that wireless Internet connection through Wibro, HSDPA, GSM, CDMA, WCDMA, LTE, and the like is executed over a mobile communication network, the wireless Internet module 113 that executes the wireless Internet connection over the mobile communication network may be construed as a type of the mobile communication module 112.

The short range communication module 114 refers to a module for short range communication. Bluetooth, Radio Frequency Identification (RFID), infrared Data Association (IrDA), Ultra Wideband (UWB), ZigBee, and the like may be used as a short range communication technology.

The location information module 115 refers to a module for obtaining a location of a mobile terminal, and a representative example includes a Global Position System (GPS) module. According to the current technology, the GPS module calculates distance information and accurate time information from at least three satellites, and applies triangulation to the calculated information so that Three-dimensional (3D) current location information based on latitude, longitude, and altitude may be accurately calculated. Currently, a method of calculating location and time information using three satellites, and correcting an error of the calculated location and time information using another satellite, has been widely used. Also, the GPS module 115 continuously calculates a current location in real time and thus, may calculate speed information.

The A/V input unit 120 is to input an audio signal or a video signal, and includes a camera 121, a microphone 122, and the like. The camera 121 processes an image frame such as a still image, a video, or the like obtained by an image sensor in a video call mode or a photographing mode. The processed image frame may be displayed on a display unit 151.

The image frame processed in the camera 121 may be stored in the memory 160, or may be transmitted outside the wireless communication unit 110. Two or more cameras 121 may be included based on a service environment.

The microphone 122 may receive an input of an external sound signal through a microphone and processes the signal into electrical voice data, in a call mode, a recording mode, a voice recognition mode, and the like. In the case of the call mode, the processed voice data may be converted into a form that may be transmittable to a mobile communication base station through the mobile communication module 112, and may be output. In the microphone 122, various noise removal algorithms may be embodied for removing noise generated during a process of receiving an external sound signal.

The user input unit 130 may generate input data for a user to control operations of a terminal. The user input unit 130 may be configured to include buttons 136 disposed on the front, back, or lateral sides of the mobile terminal 100, and a touch sensor (resistive/capacitive) 137, and, although not illustrated, may be configured to further include a keypad, a dome switch, a jog wheel, a jog switch, and the like.

The sensing unit 140 generates a sensing signal for controlling operations of the mobile terminal 100 by sensing a current state of the mobile terminal 100 such as whether the mobile terminal 100 is in a state of being opened or shut, a location of the mobile terminal 100, whether a user is in contact, a compass direction of the mobile terminal, an acceleration/deceleration of the mobile terminal, and the like. For example, when the mobile terminal 100 is in a form of a slide phone, the sensing unit 140 may sense whether the slide phone is opened or shut. Also, whether the power supplier 190 supplies power, whether the interface unit 170 is coupled with an external device, or the like may be sensed. Meanwhile, the sensing unit 140 may include a proximity sensor 141. (The proximity sensor will be described later.) The sensing unit 140 may also include a grip sensor 142 for determining if a user is holding the mobile terminal 100 and a pressure sensor 143 for determining altitude.

The output unit 150 is to generate an output associated with visual sensation, auditory sense, tactile sense, or the like, and may include a display unit 151, a sound output module 152, an alarm unit 153, a haptic module 154, and the like.

The display unit 151 may display (output) information processed in the mobile terminal 100. For example, when the mobile terminal is in a call mode, the display unit 151 may display a User Interface (UI) or a Graphic User Interface (GUI) associated with a call. When the mobile terminal 100 is in a video call mode or a photographing mode, a photographed and/or received image or UI or GUI may be displayed.

The display unit 151 may include at least one of a Liquid Crystal Display (LCD), a Thin Film Transistor-Liquid Crystal Display (TFT LCD), an Organic Light-Emitting Diode (OLED), a flexible display, and a 3D display.

A few of the displays may be configured to be a transparent type or a light transmission type so that the outside may be viewed through the displays. This may be referred to as a transparent display, and a representative transparent display includes a Transparent OLED (TOLED) and the like. The structure of the back of the display unit 151 may be configured to be a structure of a light transmission type. Through the structure, the user may view a subject that is located in the back of a terminal body through an area occupied by the display unit 151 of the terminal body.

Based on a type of the mobile terminal 100, two or more display units 151 may exist. For example, a plurality of display units may be disposed on one side of the mobile terminal 100 to be spaced apart from one another or to be integrated, or may be disposed on different sides.

When the display unit 151 and the touch sensor 137 form a layer structure or are formed to be integrated (hereinafter, referred to as a 'touch screen'), the display unit 151 may be used as an input device, in addition to an output device. The touch sensor is in a form of, for example, a touch film, a touch sheet, a touch pad, and the like, the touch sensor may be formed in a layer structure by being layered on the display unit 151, and may be included in the configuration of the display unit 151 and may be integrated.

The touch sensor may be configured to convert, into an electrical input signal, a pressure provided on a portion of the display unit 151 or a change in a capacitance and the like generated in a portion of the display unit 151. The touch sensor may be configured to detect a pressure of a touch, in addition to a location and an area of the touch, when the touch is provided.

When a touch input for the touch sensor exists, a signal(s) corresponding to the touch input is transferred to a touch controller (not illustrated). The touch controller processes the signal(s), and transmits corresponding data to the controller 180. Therefore, the controller 180 may be aware of an area of the display unit 151 that is touched and the like.

The proximity sensor 141 may be disposed in an internal area of the mobile terminal 100 which is enclosed by the touch screen, or may be disposed near the touch screen. The proximity sensor refers to a sensor that detects whether an object that approaches a side for detection or an object adjacent to the side exists, using an electromagnetic field force or infrared light, without a mechanical contact. The proximity sensor has a longer lifecycle and higher utilization than a contact type sensor. Examples of the proximity sensor includes a transparent photoelectric sensor, a direct reflective photoelectric sensor, a mirror reflective photoelectric sensor, a high-frequency oscillation proximity sensor, a capacitive proximity sensor, a magnetic proximity sensor, an infrared proximity sensor, and the like. When the touch screen is a capacitive type, it may be configured to detect the proximity of a pointer based on a change in a magnetic field which occurs as the pointer approaches. In this case, the touch screen (touch sensor) may be classified as a proximity sensor.

Hereinafter, for ease of description, a motion that enables a pointer to approach the touch screen without contact so that it is recognized that the pointer is located on the touch screen, is referred to as "proximity touch", and a motion that enables a pointer to be actually in contact with the touch screen is referred to as "contact touch". The location on the touch screen where the proximity touch of the pointer occurs may refer to a location where the pointer is vertical to the touch screen when the pointer is in a proximity touch.

The proximity sensor senses a proximity touch, a proximity touch pattern (for example, a proximity touch distance, a proximity touch direction, a proximity touch speed, a proximity touch time, a proximity touch location, a proximity touch movement state, and the like). Information corresponding to a detected proximity touch motion and a proximity touch pattern may be output on the touch screen.

The sound output module 152 may output audio data that is received from the wireless communication unit 110 or is stored in the memory 160, in a call signal reception mode, a call mode, a recording mode, a voice recognition mode, a broadcasting reception mode, and the like. The sound output module 152 may output a sound signal associated with a function (for example, a call signal reception sound, a message reception sound, and the like) executed in the mobile terminal 100. The sound output module 152 may include a receiver, a speaker, a buzzer, and the like.

The alarm unit 153 outputs a signal for informing the user that an event of the mobile terminal 100 has occurred. Examples of the event occurring in the mobile terminal include reception of a call signal, reception of a message, input of a key signal, input of a touch, and the like. The alarm unit 153 may output a signal that informs the user of occurrence of an event through a different form excluding a video signal or an audio signal, for example, vibration. The video signal or the audio signal may be output through the display unit 151 or the voice output module 152 and thus, in this example, the display unit 151 and the voice output module 152 may be classified as a type of alarm unit 153.

The haptic module 154 may generate various tactile effects that a user may feel. A representative example of the tactile effect generated by the haptic module 154 includes vibration. An intensity, a pattern, and the like of the vibration generated by the haptic module 154 may be controllable. For example, different vibrations may be composed for output, or may be sequentially output.

In addition to the vibration, the haptic module 154 may generate various tactile effects such as an effect by arrangement of pins which are in vertical movement with respect to a contact surface of skin, jet force or suction force of air through an outlet or an inlet, brushing against a surface of the skin, contact of an electrode, stimulus by electrostatic force, and the like, an effect by reproduction of a sense of cold and warmth using heat absorption or heat generation, and the like.

The haptic module 154 may be embodied to transfer a tactile effect through direct contact, and to enable a user to feel a tactile effect through muscle sense of fingers, arms, and the like. Two or more haptic modules 154 may be included based on a configuration pattern of the mobile terminal 100.

The memory unit 160 may store a program for processing and controlling the controller 180, and may execute a function of temporarily storing input/output data (for example, a phone book, a message, audio data, a still image, video data, and the like). The memory unit 160 may store a frequency of use for each data (for example, the frequency of use for each phone number, each message, and each multimedia).

Also, the memory unit 160 may store data associated with vibrations and sounds of various patterns output when a touch is input to the touch screen.

The storage unit 160 may include at least one type of storage medium of a flash memory type, a hard disk type, a multimedia card micro type, a card type memory (for example, an SD memory, an XD memory or the like), a Random Access Memory (RAM), a Static RAM (SRAM), a Read-Only Memory (ROM), an Electrically Erasable Programmable ROM (EEPROM), a PROM, a magnetic memory, a magnetic disk, and an optical disk. The mobile terminal 100 may operate in association with a web storage that executes a storage function of the memory 160 on the Internet.

The interface unit 170 may act as a path to all external devices connected to the mobile terminal 100. The interface unit 170 may receive data from an external device, may transfer supplied power to each component element inside the mobile terminal 100, or may transmit data inside the mobile terminal 100 to an external device. For example, a wired/wireless headset port, an external charger port, a wired/wireless data port, a memory card port, a port used for connecting a device equipped with an identification module, an audio Input/Output (I/O) port, a video I/O port, an earphone port, and the like may be included in the interface unit 170.

The identification module is a chip that stores various sets of information for authenticating authority for use of the mobile terminal 100, and may include a User Identify Module (UIM), a Subscriber Identity Module (SIM), a Universal Subscriber Identity Module (USIM), and the like. The device equipped with the identification module (hereinafter, 'identification device') may be manufactured in a form of a smart card. Therefore, the identification device may be connected with the terminal 100 through a port.

When the mobile terminal 100 is connected with an external cradle, the interface unit may be a path through which power from the cradle is supplied to the mobile terminal 100, or may be a path through which various command signals input by a user through the cradle may be transferred to the mobile terminal. The various command signals or power input from the cradle may operate as signals used for recognizing that the mobile terminal is accurately installed in the cradle.

Generally, the controller 180 controls general operations of a mobile terminal. For example, for a voice call, data communication, video call, and the like, related controlling and processing may be executed by the controller 180. The controller 180 may include a multimedia module 181 for playing back multimedia. The multimedia module 181 may be embodied inside the controller 180, or may be embodied to be separate from the controller 180.

The controller 180 may execute a pattern recognition processing that recognizes a writing input and a drawing input provided on the touch screen as a character and an image, respectively.

The power supplier 190 may supply power required for operations of component elements by receiving power from the outside and inside according to a control of the controller 180. The power supplier 190 may include, for example, a battery, a connection port, a power supply controller, and a charging monitoring unit.

The battery may be an embedded battery which is rechargeable, or may be coupled with a terminal body to be detachable for charging or the like. The connection port may be configured as an example of the interface 170 to which an external charger that supplies power for charging a battery is electrically connected.

Various embodiments described herein may be embodied in a computer (or a similar device)-readable recording medium using, for example, software, hardware, or a combination thereof.

In a manner of hardware, the various embodiments described herein may be embodied using at least one of Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, micro-controllers, microprocessors, and electrical units for executing other functions. In some cases, the various embodiments described in the present specification may be embodied through the controller 180.

In a manner of software, various embodiments described in the present specification, such as a procedure and a function may be embodied through software modules. Each of the software modules may implement one or more functions and operations described in the present specification. A software code may be embodied through a software application written in an appropriate program language. The software code may be stored in the memory 160, and may be implemented by the controller 180.

Figure 3:
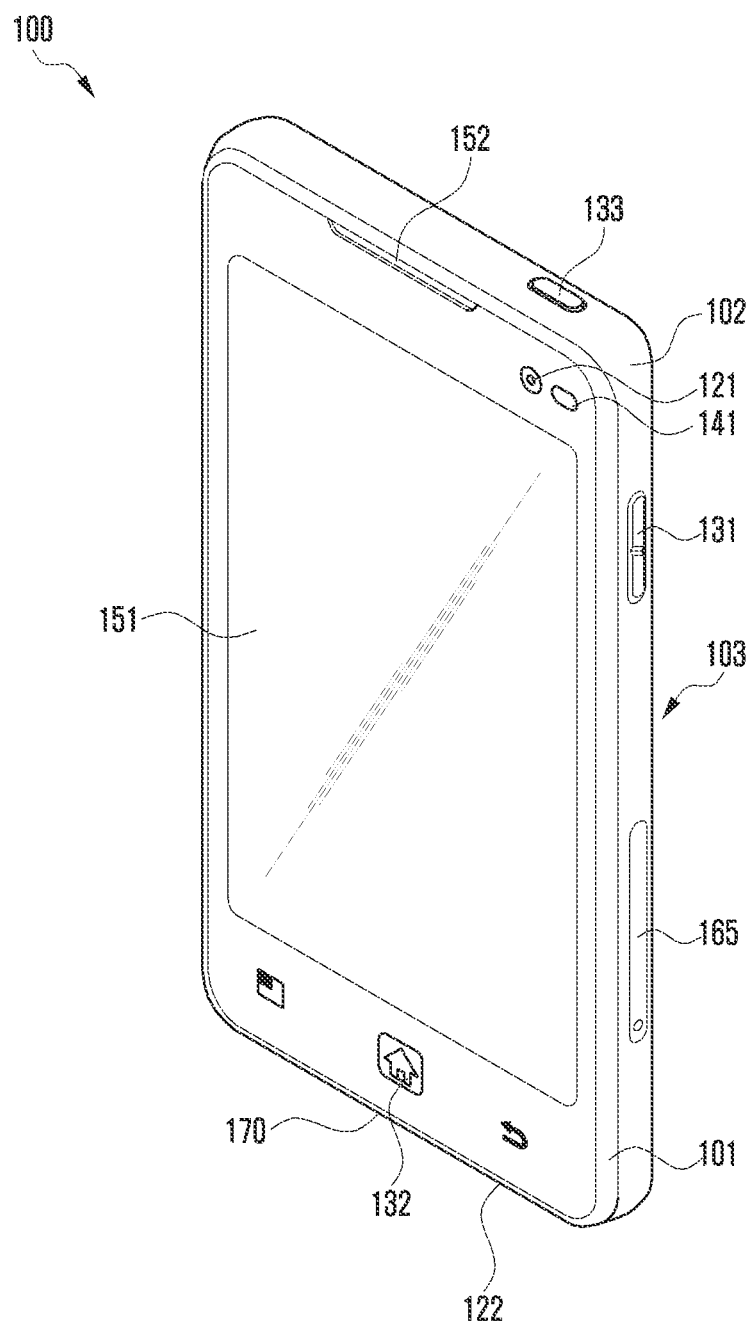
FIG. 3 is a front side perspective view of a mobile terminal according to an embodiment of the present disclosure.

FIG. 3 is a front side perspective view of an example of a mobile terminal or a portable terminal according to an embodiment of the present disclosure.

The disclosed mobile terminal 100 has a terminal body in the form of a bar. The present disclosure may not be limited thereto, and may be applied to various structures such as a slide type, folder type, a swing type, a swivel type, and the like that includes two or more bodies coupled to move in a relative manner.

Referring to FIG. 3, the body of the mobile terminal 100 includes cases 101, 102, and 103 that form an exterior. In the present embodiment, the cases may be distinguished into the front case 101 and a rear case 102. Various electronic components are included in a space formed between the front case 101 and the rear case 102.

For a component that may be detachable like a sub-storage medium 165 such as a USIM card, a memory card, and the like, the case may include an opening part through which the component is inserted into the inside of the case from an external side. A slot may be formed on a lateral side of the case so that the sub-storage medium 165 is inserted from the lateral side of the mobile terminal 100 and is contained in the mobile terminal.

The cases 101, 102, and 103 may be formed by catapulting synthetic resins, or may be formed of metal such as STainless Steel (STS), Titanium (Ti), or the like.

On the case 101 and 102 of the terminal, the display unit 151, the sound output unit 152, the camera 121, the user input units 130, 131, and 132, the microphone 122, the interface 170, and the like may be disposed.

The display unit 151 occupies most of a principal plan of the front case 101. The sound output unit 152, the camera 121 and proximity sensor 141 may be disposed on an area adjacent to one of the two ends of the display unit 151, and the user input unit 131 and the microphone 122 may be disposed on an area adjacent to the other end. The user input unit 132, the interface 170, and the like may be disposed on lateral sides of the front case 101 and the rear case 102.

The user input unit 130 is manipulated to receive a command for controlling operations of the mobile terminal 100, and may include a plurality of manipulation units 131, 132, and 133. The manipulation units 131, 132, and 133 may be commonly called manipulating portions.

The content input by a first manipulation unit 131 or a second manipulation unit 132 may be variously set. For example, the first manipulation unit 131 may receive a command such as starting, ending, scrolling, and the like, the second manipulation unit 132 may receive a command such as controlling a volume of a sound output from the sound output unit 152, and the third manipulation unit 133 may receive a command such as a touch recognition mode activation/deactivation of the display unit 151 and the like.

The manipulation units 131, 132, and 133 may be based on a button scheme that recognizes a command when a user applies a pressure, or may include a touch sensor in manipulation units 131, 132, and 133, in addition to in the display unit 151, so as to receive an input of a command with only a touch of a user.

Figure 4:
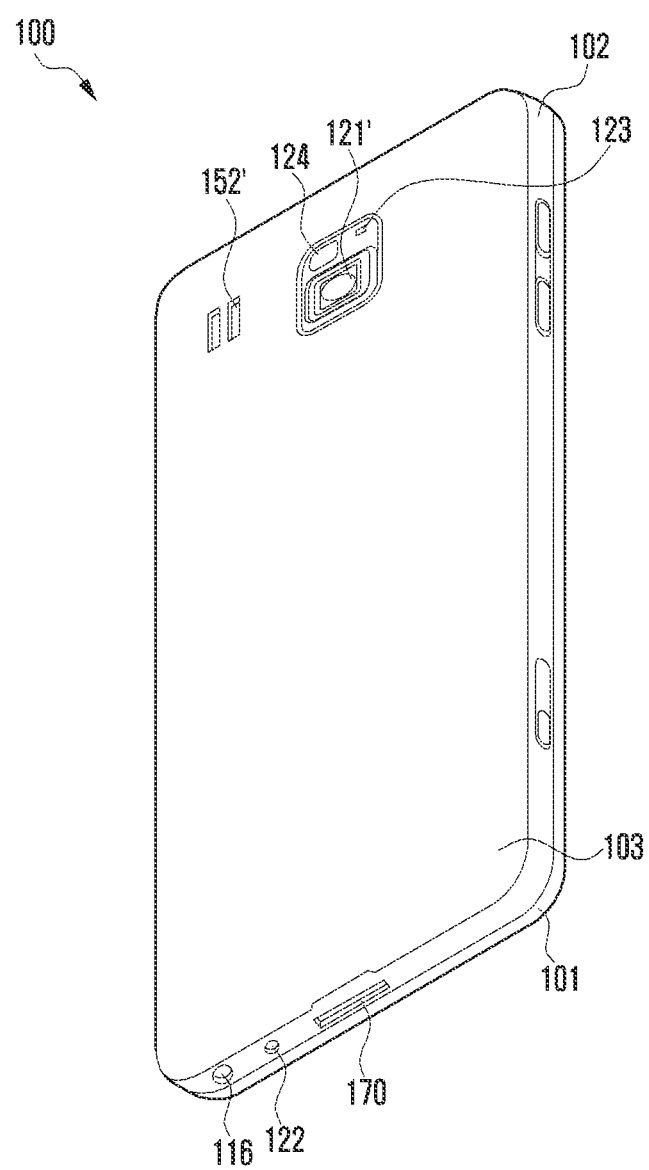
FIG. 4 is a back side perspective view of a mobile terminal according to an embodiment of the present disclosure.

FIG. 4 is a back side perspective view of mobile terminal of FIG. 3 according to an embodiment of the present disclosure.

Referring to FIG. 4, the mobile terminal 100 includes a camera 121' may be additionally installed on the back side of the terminal body, that is, the rear case 102. The camera 121' may be a camera that has a substantially reverse photographing direction of the camera 121 (please see FIG. 3), and has identical or different number of pixels to/from the camera 121.

For example, it is preferable that the camera 121 has a low number of pixels so as to photograph a face of a user and to readily transmit the photographed image to a partner when a video call and the like is performed, and the camera 121' has a high number of pixels since the camera 121' usually does not transmit a photographed image immediately after photographing a general subject. The cameras 121 and 121' may be installed in the terminal body to be rotated or popped-up.

A flash 123 and a mirror 124 may be additionally disposed near the camera 121'. The flash flashes light toward a subject when the subject is photographed by the camera 121'. When a user desires to photograph himself/herself using the camera 121', the user views a face of the user or the like reflected by the mirror 124.

A sound output unit 152' may be additionally disposed on the back side of the terminal body. The sound output unit 152' of the back side of the body may embody a stereo function together with the sound output unit 152 (please see FIG. 2) of the front side of the body, and may be used for embodying a speaker phone for calling.

On a lateral side of the terminal body, a broadcasting signal reception antenna 116 may be additionally disposed, in addition to an antenna for calling. The antenna 116 that forms a portion of the broadcasting reception module 111 (please see FIG. 2) may be installed to be withdrawn from the terminal body.

For ease of description, it is assumed that the mobile terminal 100 described hereinafter includes at least one of component elements illustrated in FIG. 2.

Hereinafter, various embodiments associated with a controlling method that may be embodied in a mobile terminal configured as described above will be described with reference to enclosed drawings.

Figure 5:
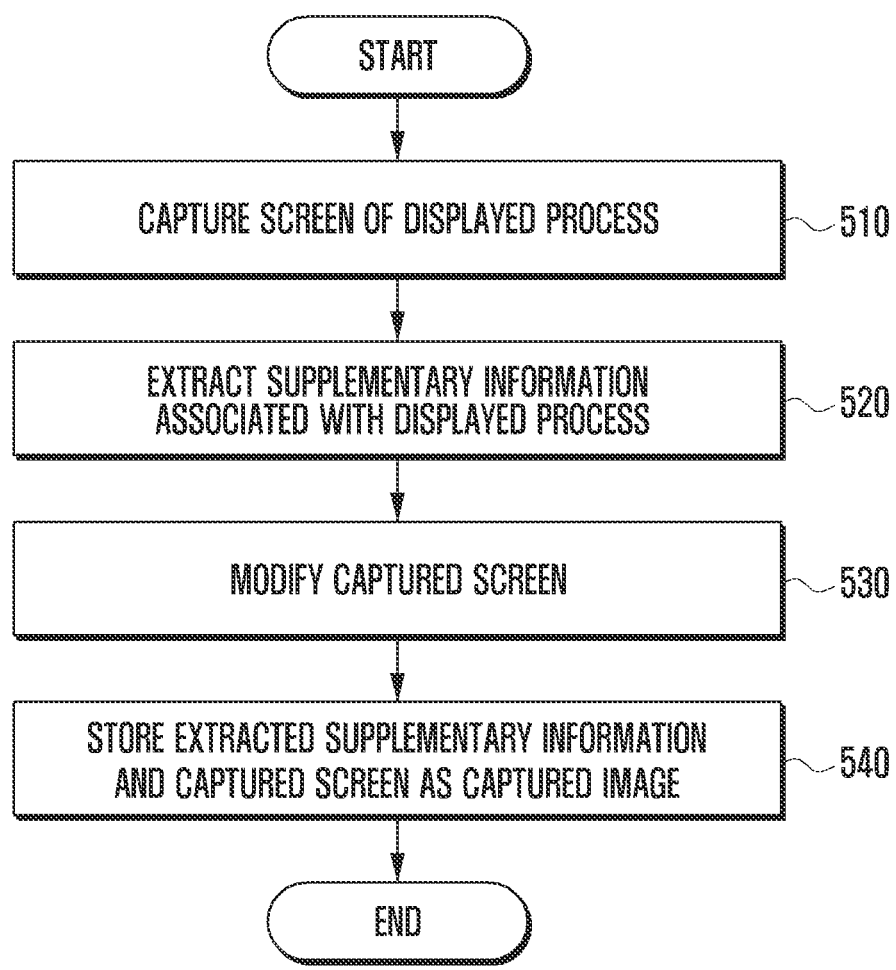
FIG. 5 is a flowchart illustrating an example of a process in which a mobile terminal generates a captured image according to an embodiment of the present disclosure.

FIG. 5 is a flowchart illustrating an example of a process in which a mobile terminal generates a captured image according to an embodiment of the present disclosure.

A mobile terminal according to an embodiment of the present disclosure includes a display unit. The display unit displays information such as an image, a picture, or the like. Depending on various embodiments, the display unit may include a touch screen.

Referring to FIG. 5, a controller captures a screen of a process displayed on the display unit in operation 510.

That is, when a screen capturing command is input, the controller captures the screen of the process that is being displayed on the display unit, according to the screen capturing command.

In this example, the screen capturing command may be an input of a physical button disposed on the mobile terminal, or may be selection of a menu. Depending on various embodiments, when the mobile terminal includes a touch screen, the screen capturing command may be provided based on a scheme of touching the touch screen with a pointer. The touch input may be provided by touching a location of the touch screen with the pointer, or by touching a location with the pointer, and dragging the touch to a distance while maintaining the touch. Alternatively, the capturing command may be provided by touching the touch screen with a pointer of a wide area, and dragging the touch while maintaining the touch. The pointer may be, for example, a finger, a stylus pen, or the like, but may not be limited thereto.

Subsequently, in operation 520, the controller of the mobile terminal extracts supplementary information associated with the process displayed on the display unit when the screen of the process displayed on the display unit is captured in operation 510. Depending on various embodiments, the controller recognizes a process that is being displayed on the display unit when the screen capturing command is input. For example, whether the process being displayed is a process including a Uniform Resource Locator (URL), a process including a local link, or the like may be determined.

In this example, the process including the URL may be, for example, a process that is executing a web page, but may not be limited thereto. That is, when an application is displayed, the corresponding application may include a URL address of a market where the corresponding application is purchasable.

In the present disclosure, the process including the local link is a process that is currently stored in the local area of the mobile terminal and is executed, and the local link refers to information indicating a point where the corresponding process is stored. For example, it may indicate a video file stored in the local memory of the mobile terminal, or the like, but this may not be limited thereto.

The controller recognizes the process displayed on the display unit, and may extract supplementary information associated with the corresponding process. In this example, the supplementary information for extraction may be set in advance, or a user may provide an input to extract supplementary information. For example, in a case of a process including a URL, it is set to extract the URL when a screen capturing command is input. In the case of a process including a web page, the user may set to extract a word disclosed in a corresponding web page before capturing a screen.

Depending on the various embodiments, when the process includes a URL, the supplementary information may be a URL address that the process includes. Also, when the process includes a web page, the supplementary information may further include information associated with an area of the web page displayed on the display unit. That is, information indicating the area of the corresponding web page, displayed on the display unit, and may be included together with the URL address of the corresponding web page. For example, it may be sentence information associated with a sentence of the beginning of the area of the web page displayed on the display unit and the like. Detailed descriptions thereof will be described later.

Also, when the process includes a local link, the supplementary information may be the local link of the process. When a first mobile terminal transmits the local link information to a second mobile terminal, the second mobile terminal may execute the corresponding process by connecting to the first mobile terminal based on the corresponding local link. Also, access right information associated with the local data of the first mobile terminal may be further included so that the second mobile terminal executes the process based on the local link. Detailed descriptions thereof will be described later.

Depending on the various embodiments, the controller performs controlling so that extraction of supplementary information is automatically executed when a screen capturing command is input or performs controlling so that extraction of supplementary information is executed when an additional command for extraction of supplementary information is input. For example, when the process being displayed includes a URL, the controller performs controlling to extract the URL of the process when the screen capturing command is input and a screen is captured in operation 510. Alternatively, the controller may perform controlling to extract the URL of the process when the user additionally inputs the command for extracting supplementary information after the screen capturing command is input. For example, when the screen capturing command is input, a pop-up window is displayed to confirm whether to perform extracting supplementary information together with capturing of the screen. The supplementary information may be extracted when a confirmation command is input to the pop-up window, but this may not be limited thereto.

Selectively, in operation 530, the controller performs controlling to modify the captured screen. That is, the controller may perform controlling to modify the screen captured in operation 510, based on an input of the user or when a condition is satisfied.

For example, the user may briefly write a memo concerning the reason for capturing the corresponding screen or the like on the captured screen, after capturing the screen displayed on the display unit according to the screen capturing command. Alternatively, when a part that requires privacy protection or the like exists in the captured screen, the captured screen may be edited by partially erasing the corresponding part. Alternatively, the controller may perform controlling to change an illumination, a contrast range, and the like for a portion of the captured screen, but this may not be limited thereto.

Also, although not illustrated, the extracted supplementary information may also be modified, in addition to the modification of the captured screen.

In this example, a modification command such as the memo or the like may be executed by selecting a menu, or may be executed through an input of a touch signal by touching a touch screen with a pointer when the display unit includes the touch screen. Alternatively, the controller may perform controlling to modify the captured screen when a pop-up window that confirms whether to modify the screen before storing the captured screen is displayed, and may perform controlling to modify the captured screen when a confirmation command is input in the pop-up window.

Subsequently, in operation 540, the controller performs controlling to store the supplementary information extracted in operation 520 in the memory together with the screen captured in operation 510, as a captured image.

That is, by storing the captured screen of the process displayed on the display unit and the supplementary information associated with the process as a single captured image, the user may conveniently manage the supplementary information associated with the corresponding process. Also, when the captured image is provided to the second mobile terminal, a third-party that is provided with the captured image may readily recognize the intention of a sender through the captured image.

Depending on the various embodiments, the captured image may further include identification information indicating that supplementary information is included. For example, an icon indicating that supplementary information is included in a portion of the captured image may be displayed and stored together. Alternatively, the icon indicating the stored captured image may include a description indicating that supplementary information exists, but this may not be limited thereto.

FIG. 6 is a flowchart illustrating an example of a process in which a mobile terminal generates a captured image according to another embodiment of the present disclosure.

A mobile terminal according to an embodiment of the present disclosure includes a display unit. The display unit displays information such as an image, a picture, or the like. Depending on various embodiments, the display unit may include a touch screen.

Referring to FIG. 6, a controller captures a screen of a process displayed on the display unit.

That is, when a screen capturing command is input, the controller captures the screen of the process that is being displayed on the display unit, according to a screen capturing command. This has been described with reference to operation 510 of FIG. 5 and thus, detailed descriptions thereof will be omitted.

In operation 610, the controller captures a screen of a process displayed on the display unit.

Subsequently, in operation 620, the controller determines whether extractable supplementary information of the process displayed on the display unit exists when the screen capturing command is input.

Depending on the various embodiments, the controller recognizes a process that is being displayed on the display unit when the screen capturing command is input. For example, whether the process being displayed is a process including a Uniform Resource Locator (URL), a process including a local link, or the like may be determined. Subsequently, the controller may determine whether extractable supplementary information exists based on the recognized process.

In this example, the extractable supplementary information may be set in advance based on the type of the process, or may be set by a user. For example, in a case of a process including a URL, the URL may be set in advance to be extractable supplementary information. Alternatively, in a case of a process including a local link, the local link may be set in advance to be extractable supplementary information. Also, depending on the various embodiments, when a process includes a web page, the user may set extraction of an image or a word displayed on the corresponding web page, but this may not be limited thereto. Although the process includes a URL, the URL may not be always extracted as supplementary information. The user may set to extract the URL only when a condition is satisfied. For example, the URL may be set to be extracted only when a screen capturing command is input with respect to a web page where a word exists in the process including the URL, but this may not be limited thereto.

When it is determined that the extractable supplementary information exists in operation 620, the controller may extract extractable supplementary information of the corresponding process in operation 630. However, when the extractable supplementary information does not exist, only the screen captured in operation 610 may be stored to be a captured image without extraction of the supplementary information in operation 650, and a procedure may be terminated.

In operation 630, the controller may extract the supplementary information associated with the process displayed on the display unit.

Depending on the various embodiments, the extraction of the supplementary information may be automatically executed when it is determined that the extractable supplementary information exists in operation 620. Alternatively, the controller may perform controlling to extract the supplementary information when the user inputs a supplementary information extraction command.

The extraction of the supplementary information of operation 630 is similar to the supplementary information extracting process of 520 of FIG. 5 and thus, detailed descriptions thereof will be omitted.

Selectively, in operation 640, the controller performs controlling to modify the captured screen. That is, the controller may perform controlling to modify the screen captured in operation 610, based on an input of the user or when a condition is satisfied.

For example, when a pop-up window that confirms whether to modify the captured screen is displayed and a selection command of the user is input, the controller may perform controlling to enter a modification step for modifying the captured screen before storing the captured screen as a captured image. In this example, the modification of the captured screen may be editing such as adding a memo, erasing or emphasizing a portion of the captured screen, or the like, but this may not be limited thereto. This may correspond to a random modification by the user. Operation 640 is similar to operation 530 of FIG. 5 and thus, detailed descriptions thereof will be omitted.

Also, although not illustrated, the extracted supplementary information may also be modified in addition to the modification of the captured screen.

Subsequently, in operation 650, the controller performs controlling to store, in the memory, the supplementary information extracted in operation 630 together with the screen captured in operation 610, as a captured image. Depending on various embodiments, the captured image may further include identification information indicating that supplementary information is included.

Figure 7A:
FIGS. 7A and 7B are diagrams illustrating an example of a captured image based on a screen capturing command in a mobile terminal according to an embodiment of the present disclosure.
Figure 7B:
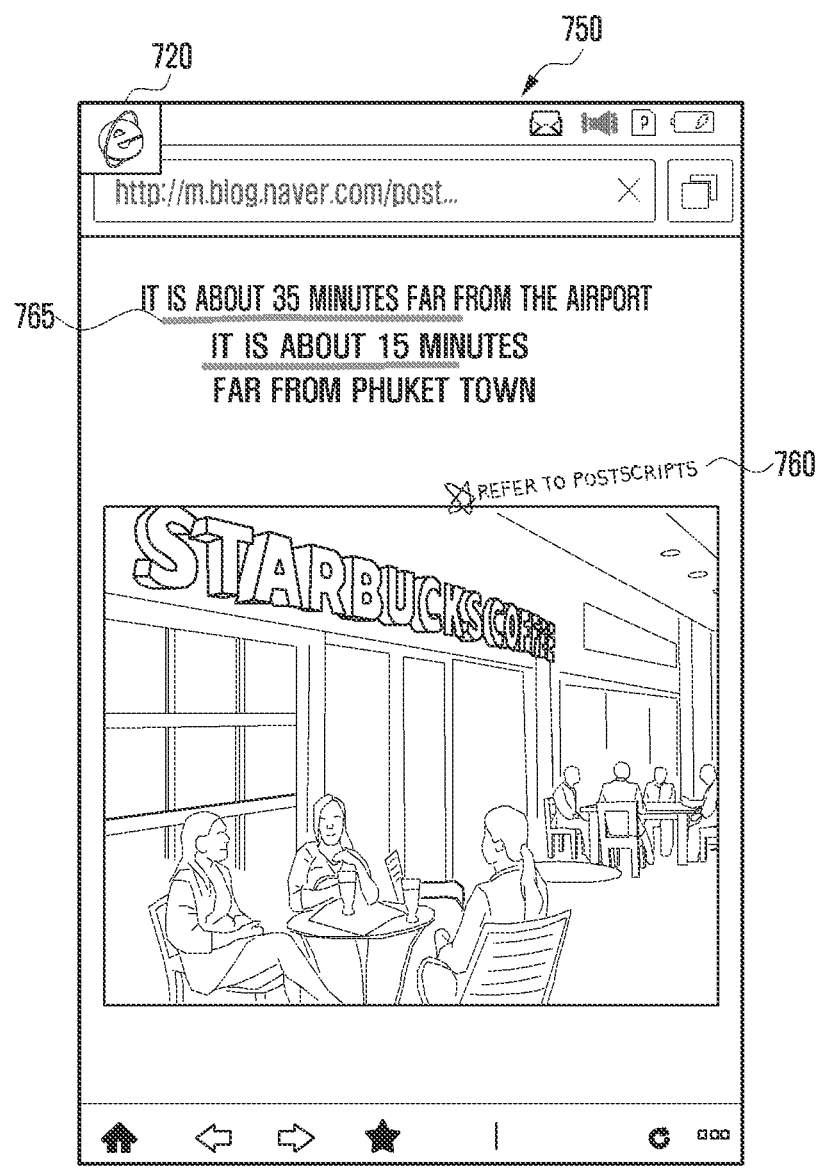

FIGS. 7A and 7B are diagrams illustrating an example of a captured image based on a screen capturing command in a mobile terminal according to an embodiment of the present disclosure.

A screen capturing command may be input for a screen of a process displayed on a display unit while a user uses a mobile terminal. In this example, the controller captures the screen of the process displayed on the display unit, extracts supplementary information associated with the process, and stores the same as a captured image, according to the screen capturing command.

FIGS. 7A and 7B are diagrams illustrating a case in which a screen capturing command is input while a process including a URL, for example, a process that executes a web page, is being displayed on the display unit.

Referring to FIG. 7A, a screen capturing command is input while a web browser application is executed in the display unit of the mobile terminal. In this example, the controller may capture a screen of a web page being displayed on the display unit, as illustrated in the drawing.

In this example, the controller may extract a URL address of the web page as supplementary information, and may store the extracted supplementary information together with the captured screen as a captured image 710. That is, the controller may store the screen of the web page displayed on the display unit and the URL address of the corresponding web page, as the captured image.

In this example, the supplementary information may further include information associated with an area of the web page displayed on the display unit, in addition to the URL address of the corresponding web page. That is, information 730 indicates an area of the corresponding web page, displayed on the display unit, may be included together with the URL address of the corresponding web page. For example, it may be sentence information 730 associated with a sentence of the beginning of the area of the web page displayed on the display unit and the like.

Additionally, as the supplementary information, in addition to the URL address, the sentence of the beginning of the web page displayed on the display unit "it is about 35 minutes far from the airport" may be stored as the information associated with the area of the screen that the user desires to capture from the corresponding web page. Therefore, when the screen capturing command is input while the web browser is executed, the URL address of the corresponding web page and information associated with a location that displays the information that the user desires to share from the web page may be stored as the supplementary information. As described above, the information associated with the area of the web page is stored in the captured image as the supplementary information and thus, detailed information that the user desires to share may be immediately obtained from the stored captured image. Accordingly, although the user does not transfer supplementary information to a third party apart from the captured image, the third part may be immediately aware of the information that the user desires to share.

Also, the captured image 710 may further include identification information 720 indicating that the captured image includes supplementary information. For example, as the identification information 720 indicating that the supplementary information exists as illustrated in the drawing, an icon 720 indicating that the captured image 710 includes URL information may be displayed. The indication information 720 is stored together in the captured image and thus, the user may intuitively recognize that the captured image 710 further includes supplementary information.

Also, although not illustrated, depending on various embodiments, when the identification information 720 is selected from the captured image 710, the controller performs controlling to display the corresponding supplementary information. For example, when the icon 720 is selected from FIG. 7A, the controller may perform controlling to display a web page URL which is the supplementary information in a form of a pop-up window. Alternatively, when the icon is selected, the controller may perform controlling to connect to a web page corresponding to the URL of the supplementary information.

Referring to FIG. 7B, a captured image 750 may be stored, including modifications 760 and 765 of the captured screen. For example, the user may briefly write a memo concerning the reason for capturing the corresponding screen or the like on the captured screen, after capturing the screen displayed on the display unit according to the screen capturing command. Alternatively, when a part that requires privacy protection or the like exists in the captured screen, the captured screen may be edited by partially erasing the corresponding part. Alternatively, the controller may perform controlling to change an illumination, a contrast range, and the like for a portion of the captured screen, but this may not be limited thereto.

That is, as illustrated in FIG. 7B, an underline 765 may be displayed under the content that is regarded by the user to be important in the corresponding web page and may be stored. Also, in addition to the content displayed on the area of the currently displayed web page, information 760 desired to be shared may be additionally displayed in a form of a memo and may be stored.

A process of generating a captured image according to an embodiment of the present disclosure and an example of a captured image generated based on the process have been described.

Hereinafter, various embodiments of captured images and a case of transmitting a captured image to another mobile terminal will be described.

Figure 8:
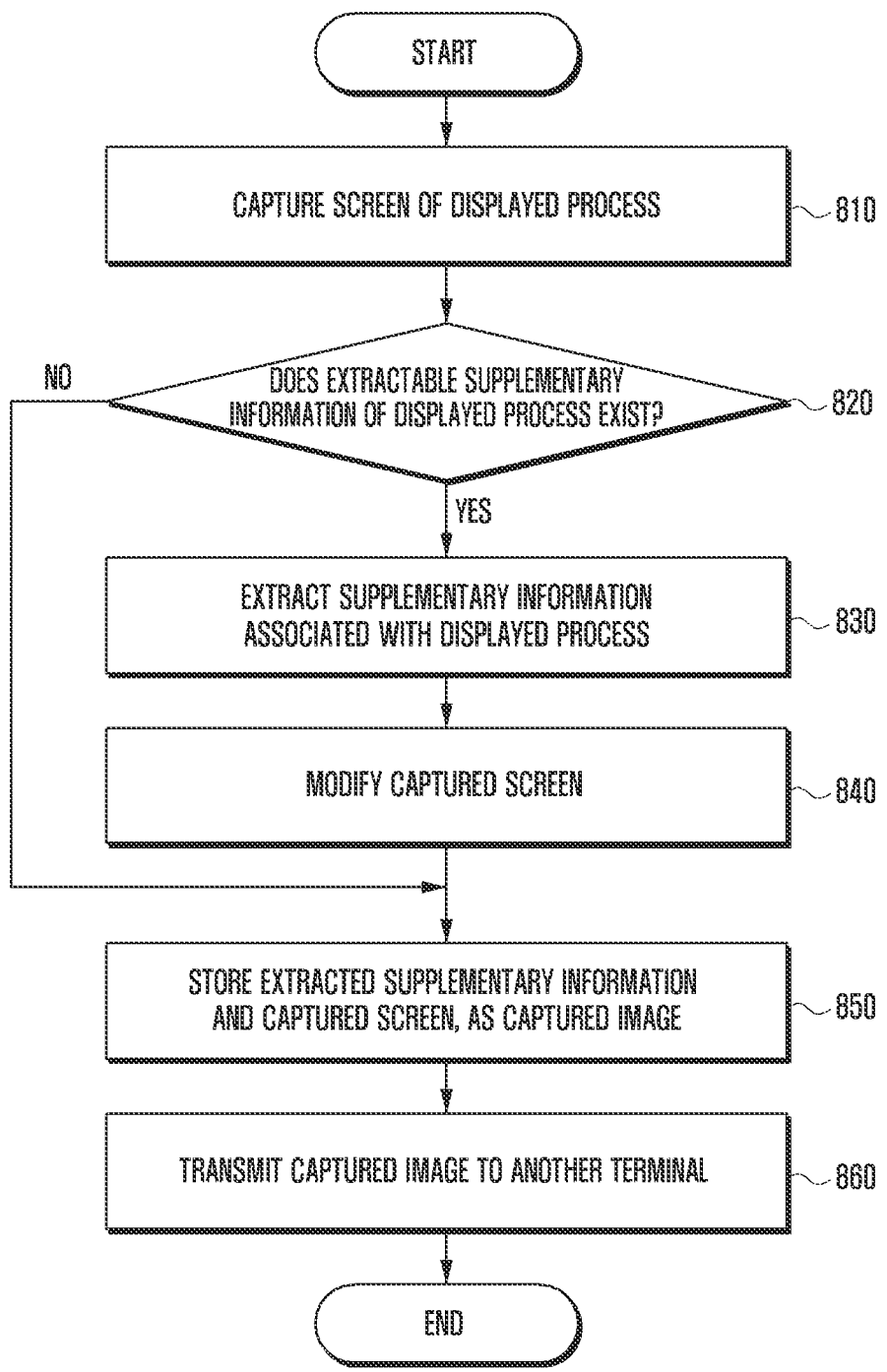
FIG. 8 is a flowchart illustrating an example of a process in which a mobile terminal generates a captured image, and shares the generated captured image with another mobile terminal according to an embodiment of the present disclosure.

FIG. 8 is a flowchart illustrating an example of a process in which a mobile terminal generates a captured image, and shares the generated captured image with another mobile terminal according to an embodiment of the present disclosure.

In a mobile terminal according to an embodiment of the present disclosure, a user generates a captured image including supplementary information of a process displayed on a display unit, transmits the captured image to another mobile terminal, and shares information with a third party.

Referring to FIG. 8, operations 810 through 850 of FIG. 8 may operate in a similar manner as operations 610 through 650 of FIG. 6. Also, since operations 820 of FIG. 8 is not executed, operations 810 through 860 may operate in a similar manner as operations 510 through 540 of FIG. 5. Therefore, detailed descriptions of operations 810 through 850 will be omitted.

In operation 860, the controller performs controlling to transmit the captured image stored in operation 850 to another mobile terminal. For example, the user may transmit the captured image to another mobile terminal using an SNS message, an e-mail, or the like. A user of the other terminal that receives the captured image may intuitively recognize the information that a sharer desires to share through the corresponding captured image. Detailed descriptions thereof will be described later.

Figure 9A:
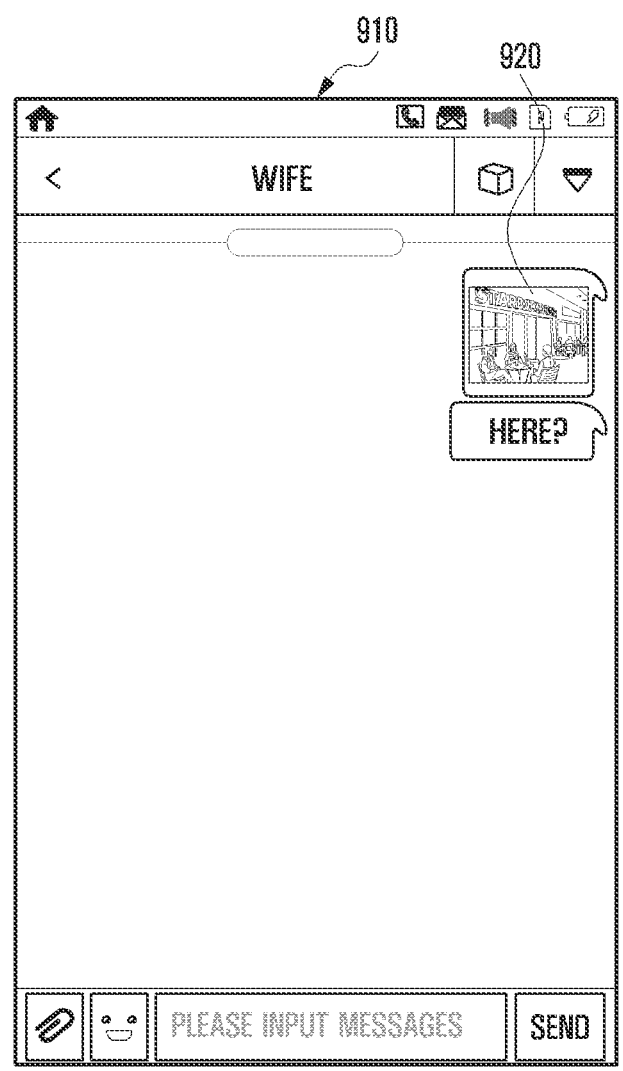
FIGS. 9A, 9B and 9C are diagrams illustrating transmission of a captured image of a web page and utilization of the captured image in a mobile terminal according to an embodiment of the present disclosure.
Figure 9B:
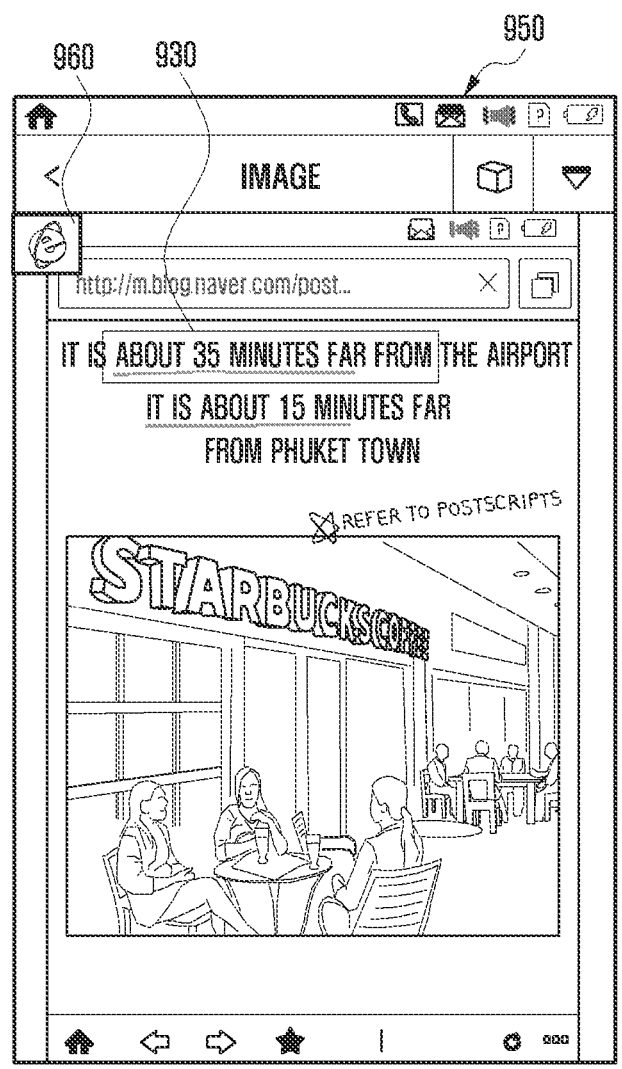
Figure 9C:
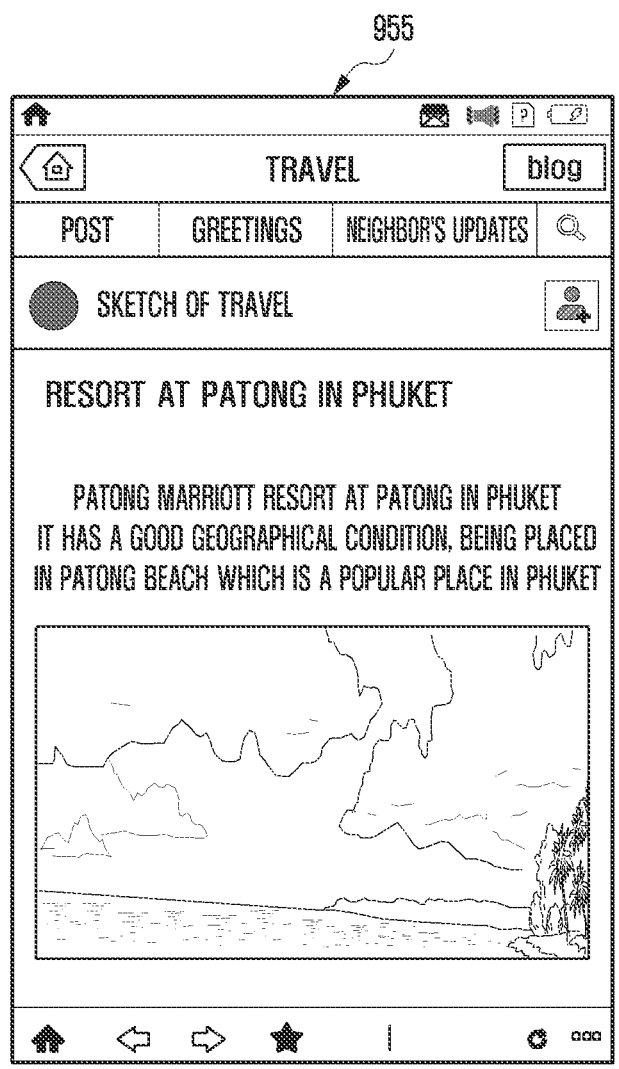

FIGS. 9A, 9B, and 9C are diagrams illustrating transmission of a captured image of a web page and utilization of the captured image in a mobile terminal according to an embodiment of the present disclosure.

Referring to FIG. 9A, a user of a first mobile terminal 910 may transmit a captured image 920 to a second mobile terminal through an SNS message.

Referring to FIG. 9B, the second mobile terminal 950 that receives the captured image may open the received captured image. In this example, the captured image 920 may be a captured image including a URL, as illustrated in FIG. 9B. That is, the captured image 920 including the URL may be generated by capturing a screen that displays a web page while the user of the first mobile terminal 910 executes a web browser. The first mobile terminal 910 may transmit the captured image 920 generated as described above to the second mobile terminal 950. In this example, the captured image 920 may include identification information 960, for example, an icon 960, indicating that supplementary information is included. Accordingly, the user of the second mobile terminal 950 may intuitively recognize that the received captured image includes supplementary information.

Also, as illustrated in the drawing, information associated with modification made by the user of the first mobile terminal 910 on the captured screen may be displayed on the captured image 920. Detailed descriptions thereof have been described and thus, the descriptions will be omitted.

The user of the second mobile terminal 950 may obtain information that the user of the first mobile terminal 910 desires to share through the captured image. For example, in FIG. 9B, the captured screen provided by the user of the first mobile terminal 910 may be seen from the captured image 920 and supplementary information may be further obtained when needed. That is, a URL address of a corresponding web page included in the captured image 920 may be obtained.

For example, the user may identify the supplementary information included in the captured image 920 through an information identification command for the captured image 920 and the like. In this example, the command of the user may be an input through selection of a menu, or may be provided through selection of supplementary information identification information 960 included in the captured image 920.

In a case of the captured image 920 including a URL, when a command of the user set in advance for the captured image 920 is input, the controller performs controlling to connect to a URL address corresponding to the captured image 920. In this example, the command of the user may be an input through selection of a menu, or may be provided through selection of supplementary information identification information 960 included in the captured image 920. When the user selects URL information included in the captured image 920, the controller, as illustrated in FIG. 9C, performs controlling to connect to a web page 955 corresponding to the corresponding URL.

Depending on various embodiments, the captured image 920 including the URL may further include information associated with an area of the web page displayed on the display unit as illustrated in FIG. 9B. That is, information 930 indicates the area of the corresponding web page, displayed on the display unit, may be included together with the URL address of the corresponding web page. For example, as illustrated in the drawing, a sentence of the beginning of the web page displayed on the display unit "it is about 35 minutes far from the airport" may be included as the supplementary information.

In this example, although not illustrated, a controller of the second mobile terminal 950 that receives the captured image 920 may perform controlling to directly connect to the area of the corresponding web page when the controller is connected to the corresponding URL address through the information 930 associated with the area of the web page displayed in the display unit and the URL address which are included in the captured image 920. For example, when the user of the second mobile terminal 950 is connected to the URL address of the captured image by selecting an icon 960 in FIG. 9B, the controller of the second mobile terminal 950 may be provided with the information 930 associated with the area of the web page from the captured image 920. Subsequently, when the URL is connected, the controller of the second mobile terminal 950 may display, on a display unit of the second mobile terminal 950, a web page of an area identical to the area where the first mobile terminal 910 captures a screen based on the information 930 associated with the area of the web page.

Also, although not illustrated, depending on the various embodiments, the controller of the second mobile terminal 950 analyzes the captured image 920, and may extract information associated with the area of the web page displayed in the captured image. For example, referring to FIG. 9B, the controller of the second mobile terminal 950 may analyze the information associated with the area of the web page displayed on the display unit of the first mobile terminal 910 when the first mobile terminal 910 generates the captured image. That is, the controller of the second mobile terminal 950 may extract the sentence of the beginning of the web page "it is about 35 minutes far from the airport", from the captured image 920. Descriptions of a method of extracting sentence information from a captured image is out of the subject matter of the present disclosure, and is widely known in the art field and thus, detailed descriptions thereof will be omitted.

Subsequently, the controller of the second mobile terminal 950 may perform controlling to directly connect to the area of the corresponding web page, when the corresponding URL address is connected based on the extracted information associated with the area of the web page. For example, when the URL address included in the captured image 920 is connected, the controller of the second mobile terminal 950 performs controlling to search for the information associated the area of the web page extracted from the corresponding web page, to detect a matched location, and to display the information on the display unit of the second mobile terminal 950.

Figure 10A:
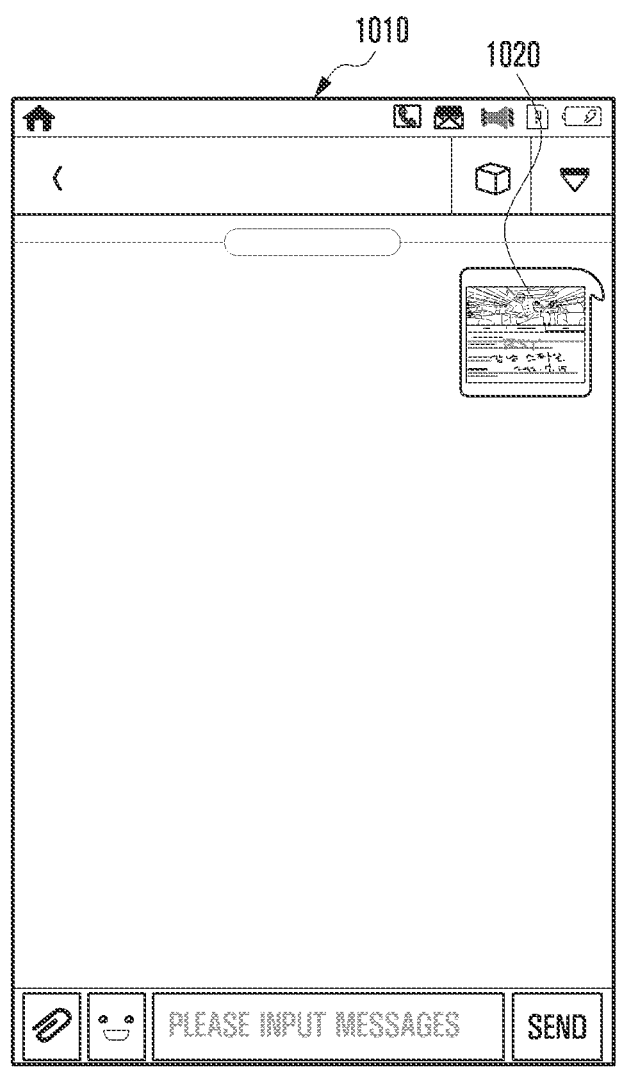
FIGS. 10A, 10B, and 10C are diagrams illustrating transmission of a captured image of a web page that plays back a video and utilization of the captured image in a mobile terminal according to an embodiment of the present disclosure.
Figure 10B:
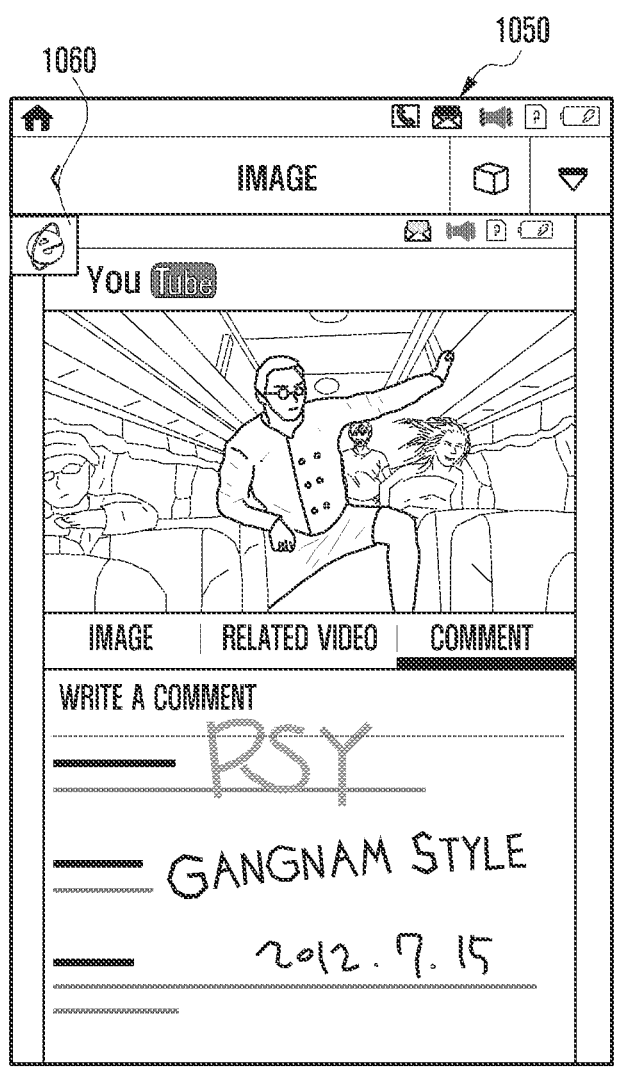
Figure 10C:
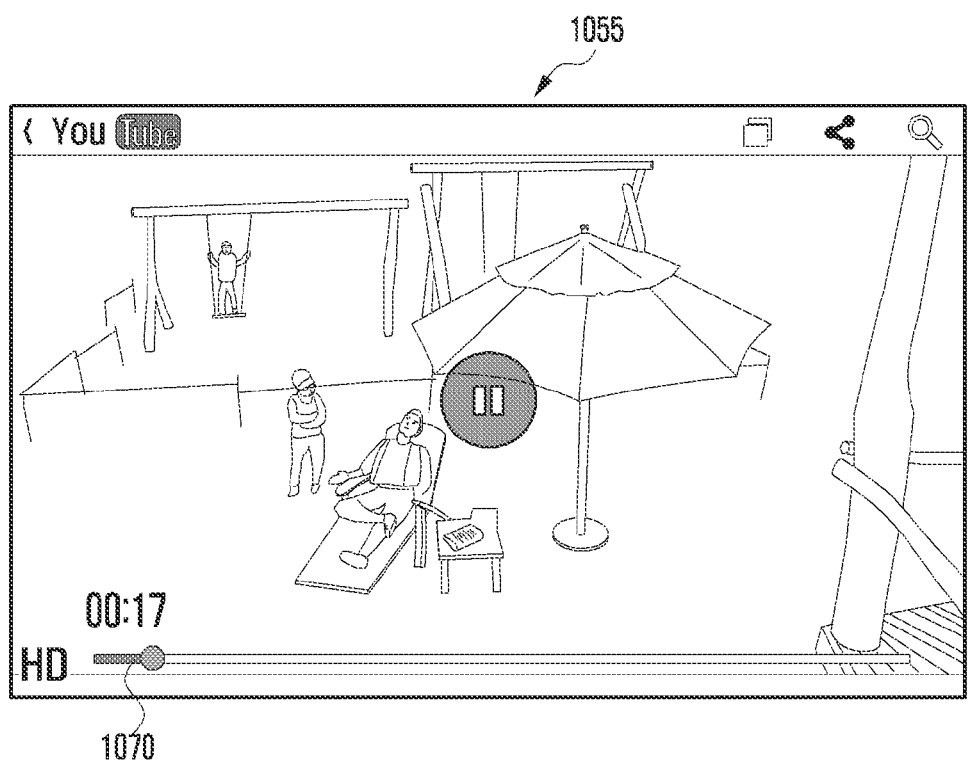

FIGS. 10A, 10B, 10C are diagrams illustrating transmission of a captured image of a web page that plays back a video and utilization of the captured image in a mobile terminal according to an embodiment of the present disclosure.

Referring to FIG. 10A, a user of a first mobile terminal 1010 may transmit a captured image 1020 to a second mobile terminal through an SNS message.

Referring to FIG. 10B, the second mobile terminal 1050 that receives the captured image may open the received captured image. In this example, the captured image 1020 may be a captured image including a URL, as illustrated in FIG. 10B. That is, the user of the first mobile terminal 1010 may input a screen capturing command while a web page that plays back a video is displayed on the display unit of the first mobile terminal 1010. For example, the web page that plays back the video may refer to a web page that plays back a video on a web site that provides video contents. In this example, a controller may generate the captured image 1020 including a URL of the corresponding web page. The first mobile terminal 1010 may transmit the captured image 1020 generated as described above to the second mobile terminal 1050. In this example, the captured image 1020 may include identification information 1060, for example, an icon 1060, indicating that supplementary information is included. Accordingly, the user of the second mobile terminal 1050 may intuitively recognize that the received captured image includes supplementary information.

Also, as illustrated in the drawing, information associated with modification made by the user of the first mobile terminal 1010 on a captured screen may be displayed in the captured image 1020. Detailed descriptions thereof have been described and thus, the descriptions will be omitted.

The user of the second mobile terminal 1050 may obtain information that the user of the first mobile terminal 1010 desires to share through the captured image. For example, in FIG. 10B, the captured screen provided by the user of the first mobile terminal 1010 may be seen from the captured image 1020 and supplementary information may be further obtained when needed. That is, a URL address of a corresponding web page included in the captured image 1020 may be obtained. Also, the user may recognize that a video is executed in the corresponding web page, and may obtain information associated with the video.

In a case of the captured image 1020 including a URL, when a command of the user set in advance for the captured image 1020 is input, the controller performs controlling to connect to a corresponding URL address of the captured image 1020. In this example, the command of the user may be an input through selection of a menu, or may be provided through selection of supplementary information identification information 1060 included in the captured image 1020. When the user selects URL information included in the captured image 1020, the controller, as illustrated in FIG. 10C, performs controlling to connect to a web page 1055 corresponding to the corresponding URL. In this example, a corresponding video in the web page may be played back.

Depending on the various embodiments, the captured image 1020 including a URL may further include time information associated with the video displayed on the display unit. For example, when a screen capturing command is input while a video is played back in a web page displayed on the display unit of the first mobile terminal 1010, the controller of the first mobile terminal 1010 may extract a URL of the corresponding web page. Further, the controller of the first mobile terminal 1010 may also extract the time information associated with the video being executed in the corresponding web page, for example, information associated with time during which the video is played back, remaining playback time of the video being played back, and the like. Subsequently, the controller may store the extracted URL information and time information associated with the video, as a captured image.

In this example, when a command for selecting supplementary information included in the captured image is input by selecting the captured image 1020, the controller may perform controlling to connect to a URL address included in the captured image 1020. In this example, as illustrated in FIG. 10C, when the video is played back in the web page of the corresponding URL, the controller may perform controlling to play back the video from a video playback point 1070 based on the time information of the video. That is, when the user is connected to the web page that plays back the video by selecting supplementary information identification information 1060 of FIG. 10B, the video may be played back from a point 1070 corresponding to 17 seconds, based on the time information associated with the video.

Figure 11A:
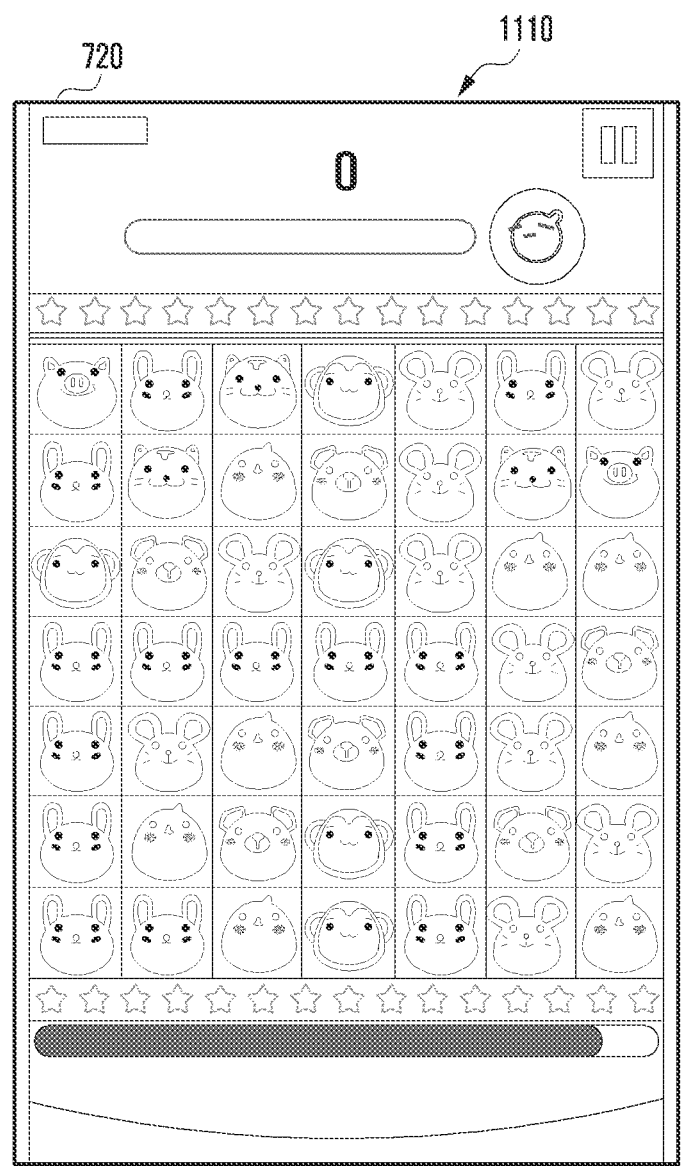
FIGS. 11A and 11B are diagrams illustrating transmission of a captured image of an application and utilization of the captured image in a mobile terminal according to an embodiment of the present disclosure.
Figure 11B:
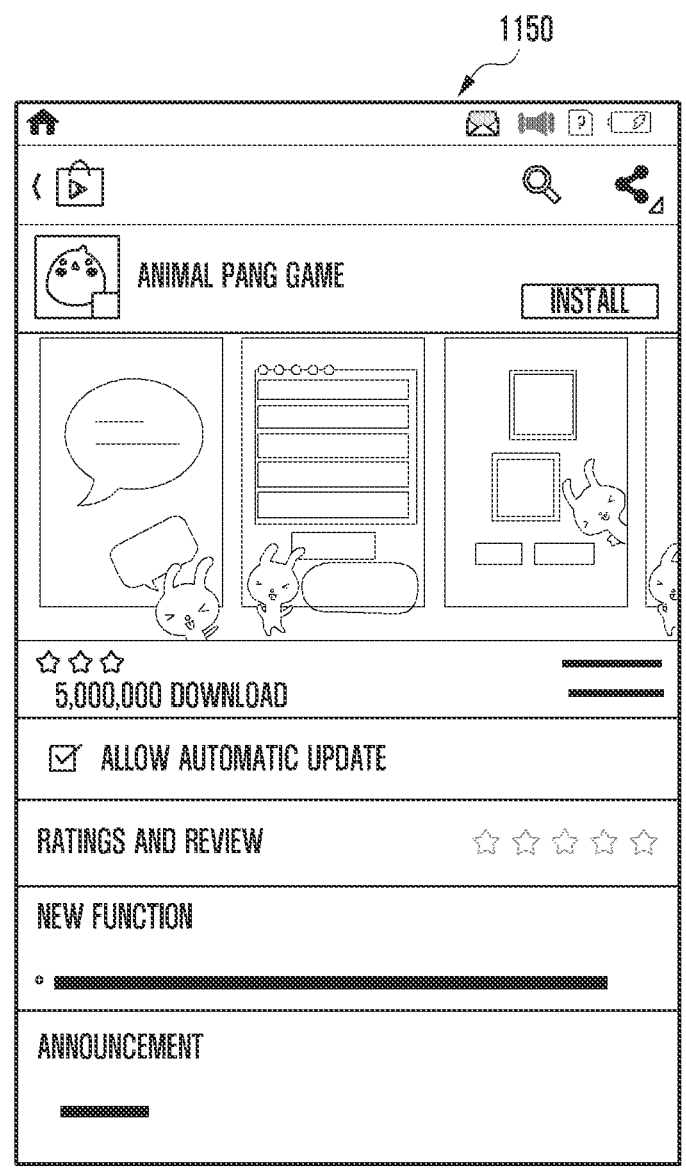

FIGS. 11A and 11B are diagrams illustrating transmission of a captured image of an application and utilization of the captured image in a mobile terminal according to an embodiment of the present disclosure.

Referring to FIG. 11A, a user of a first mobile terminal 1110 may input a screen capturing command while an application is displayed. A controller may generate a captured image based on an input of the screen capturing command.

In this example, in a case of the application, extractable supplementary information may be a corresponding URL of the application. For example, the corresponding URL may be URL information of a market where the application is purchasable, but this may not be limited thereto.

Referring to FIG. 11B, the first mobile terminal 1110 in FIG. 11A may transmit the captured image to a second mobile terminal 1150. In this example, a user of the second mobile terminal 1150 that receives the captured image may open the captured image, and may determine information that the user of the first mobile terminal 1110 desires to share.

For example, the user of the second mobile terminal 1150 that receives the captured image may determine that a captured image of an application is transmitted, and may obtain URL information of the corresponding application from the captured image through an information identification command.

In a case of the captured image including a URL, when a command of the user set in advance for the captured image is input, the controller performs controlling to connect to a corresponding URL address of the captured image. In this example, the command of the user may be an input through selection of a menu, or may be provided through selection of supplementary information identification information included in the captured image. When the user selects the URL information included in the captured image, the controller, as illustrated in FIG. 11B, performs controlling to connect to a market corresponding to the corresponding URL.

Figure 12A:
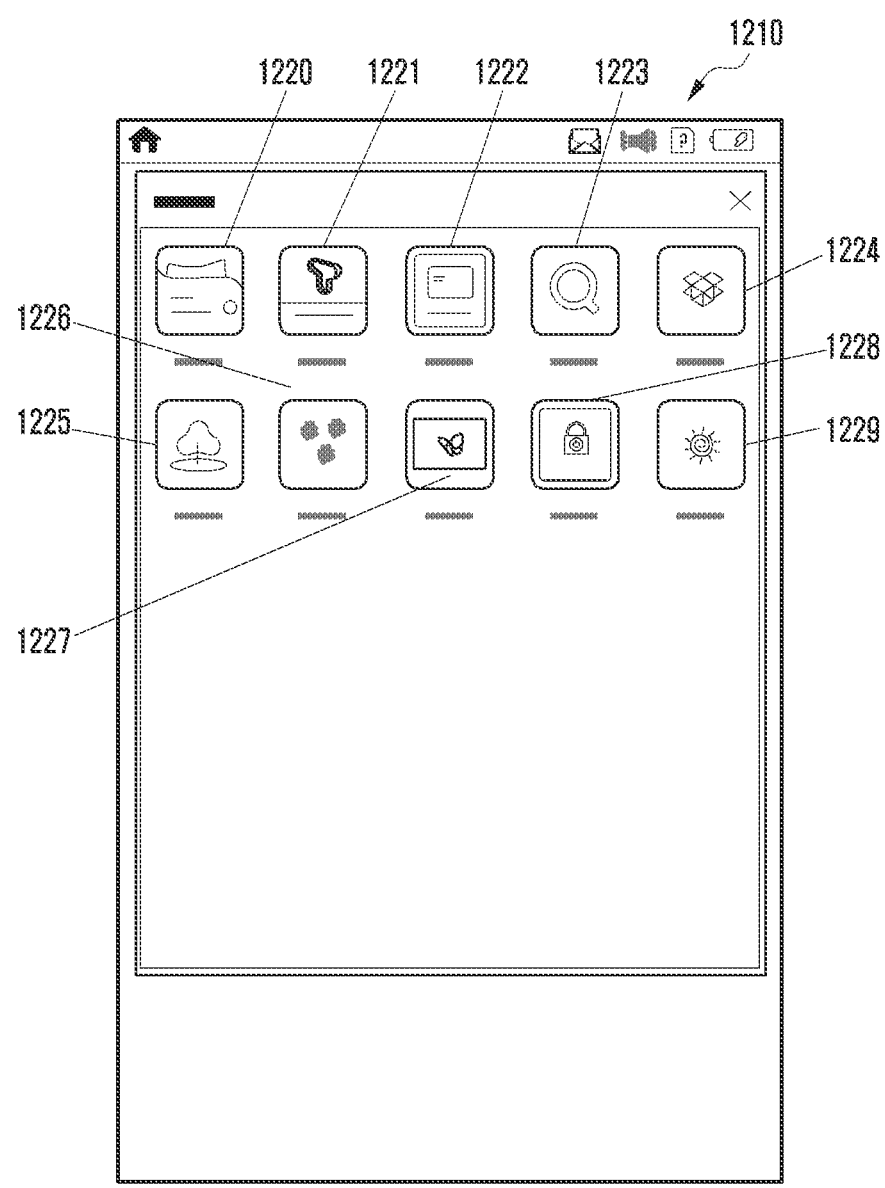
FIGS. 12A and 12B are diagrams illustrating transmission of a captured image of an application and utilization of the captured image in a mobile terminal according to another embodiment of the present disclosure.
Figure 12B:
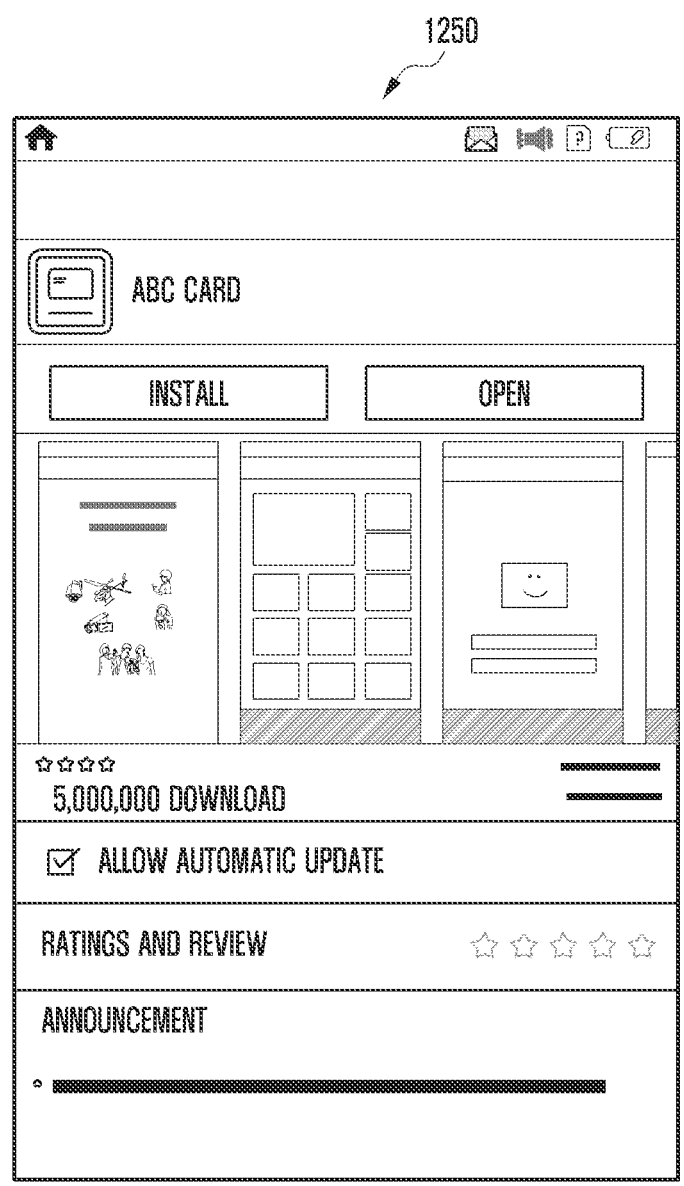

FIGS. 12A and 12B are diagrams illustrating transmission of a captured image of an application and utilization of the captured image in a mobile terminal according to another embodiment of the present disclosure.

Referring to FIG. 12A, a user of a first mobile terminal 1210 may input a screen capturing command for a screen showing that a plurality of applications 1220, 1221, 1222, 1223, 1224, 1225, 1226, 1227, 1228, and 1229 are displayed on a display unit.

In this example, for the applications 1220 through 1229, extractable supplementary information may be URLs of the applications 1220 through 1229, respectively. For example, URL information of a marker where each application 1220 through 1229 is purchasable may be extracted as supplementary information, but this may not be limited thereto.

A controller of the first mobile terminal 1210 may capture a screen where the plurality of applications 1220 through 1229 are displayed, and may extract URL addresses of the plurality of displayed applications 1220 through 1229 as supplementary information. Subsequently, the controller may store the captured screen and the extracted URL addresses, as a captured image.

In this example, depending on various embodiments, the controller may perform controlling to store the plurality of URLs in the captured image so that the extracted URLs are connected to locations of the plurality of corresponding applications 1220 through 1229. For example, information associated with a URL where the first application 1220 is purchasable may be stored by being linked to a location of the first application 1220 in the captured image. Also, information associated with a URL where the second application 1221 is purchasable may be stored by being linked to a location of the second application 1221 in the captured image.

Referring to FIG. 12B, when a command of the user set in advance for the captured image is input, the controller may perform controlling to connect to a corresponding URL address of the captured image. For example, when a command of selecting an area corresponding to the third application 1222 in FIG. 12A from the captured image is input, the controller performs controlling to connect to a market where the third application 1222 is purchasable.

Figure 13:
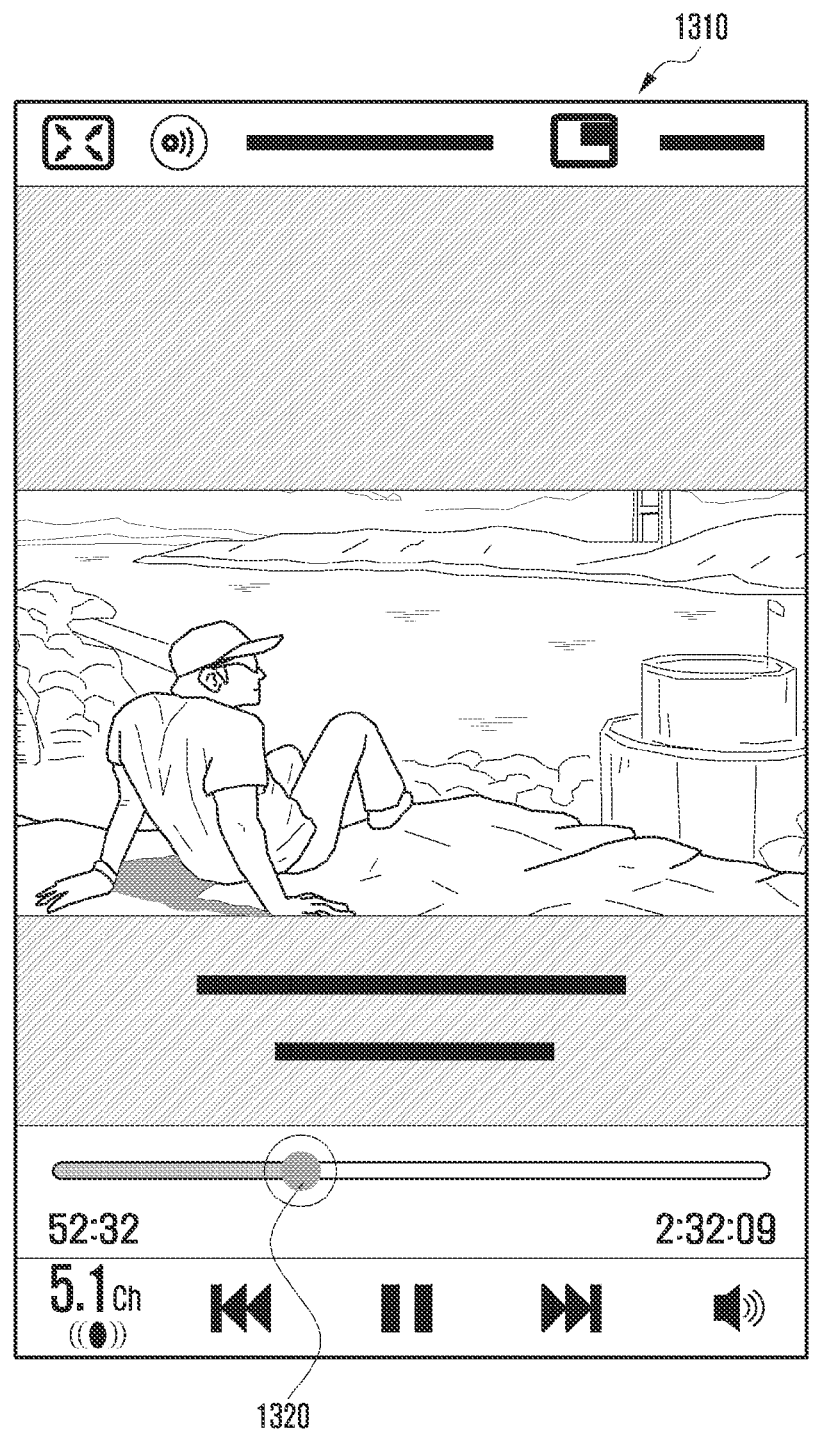
FIGS. 13, 14, 15A, and 15B are diagrams illustrating transmission of a captured image of a process including a local link and utilization of the captured image in a mobile terminal according to an embodiment of the present disclosure.
Figure 14:
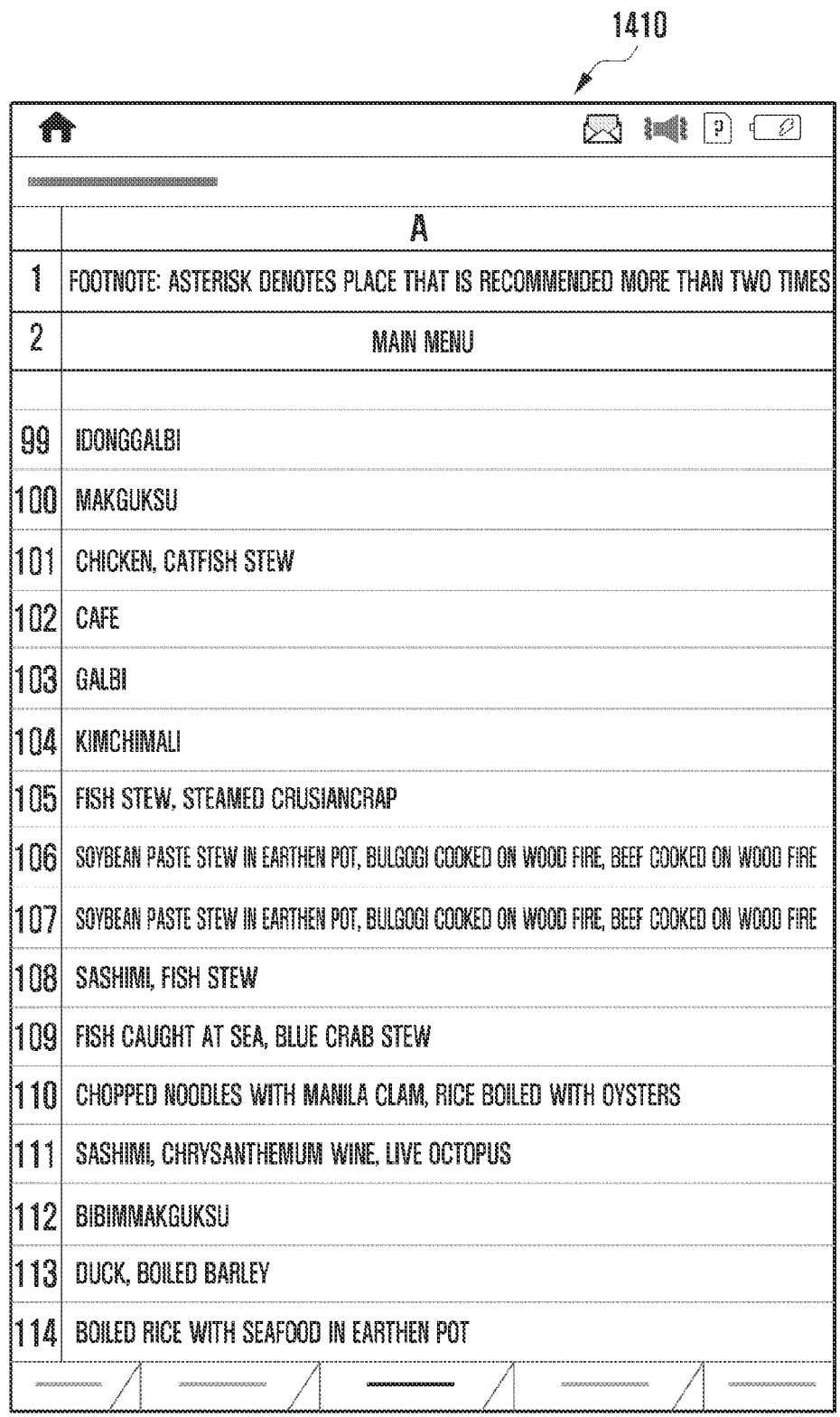

FIGS. 13 through 15 are diagrams illustrating transmission of a captured image of a process including a local link and utilization of the captured image in a mobile terminal according to an embodiment of the present disclosure.

Depending on various embodiments, a screen capturing command of a user may be input while a process including a local link is displayed on a display unit of the mobile terminal. The process including the local link is a process that is currently stored in the local area of the mobile terminal and is executed, and the local link refers to information indicating a point where the corresponding process is stored. For example, it may indicate a video file stored in the local memory of the mobile terminal, or the like, but this may not be limited thereto. When a first mobile terminal transmits a captured image including the local link information to a second mobile terminal, the second mobile terminal may execute a corresponding process by connecting to the first mobile terminal based on the corresponding local link.

In this example, when the screen capturing command for the screen of the process displayed on the display unit of the mobile terminal is input, the local link of the corresponding process may be extracted as supplementary information, but this may not be limited thereto. The supplementary information for extraction may be set in advance based on a type of the process being executed, or a user may provide an input to extract supplementary information. For example, information associated with a size of an executed file, a date of storing the file, and the like may be extracted as the supplementary information.

FIG. 13 is a diagram illustrating a case in which a screen capturing command is input while a video file is played back according to an embodiment of the present disclosure.

Referring to FIG. 13, a screen capturing command may be input while a process of playing back a video file stored in a mobile terminal 1310 is executed. In this example, a controller may extract local link information of the video file as supplementary information.

Also, time information associated with the video file may be extracted as supplementary information. For example, the controller of the first mobile terminal 1310 may also extract the time information associated with the video being played back, for example, information associated with time during which the video file is played back 1320, remaining playback time of the video being played back, and the like. Subsequently, the controller may store the extracted local link information and time information associated with the video file, as a captured image.

Subsequently, the first mobile terminal may transmit the captured image to a second mobile terminal. When a user command such as a selection command for the received captured image and the like is input, a controller of the second terminal connects to the first mobile terminal based on the local link information included in the captured image and plays back the corresponding video file. In this example, when the captured image includes time information associated with the video file, the controller of the second mobile terminal may perform controlling to play back the video file from a playback point based on the time information associated with the video file.

FIG. 14 is a diagram illustrating a case in which a screen capturing command is input while a document file such as an Excel file and the like is executed according to an embodiment of the present disclosure.

Referring to FIG. 14, a screen capturing command may be input while a process of playing back a document file stored in a mobile terminal 1410 is executed. In this example, a controller may extract local link information of the document file as supplementary information.

Also, in this example, information associated with an area of a document displayed on a display unit may be extracted as supplementary information. For example, as illustrated in FIG. 14, "99 Idonggalbi" may be extracted as the information associated with the document area displayed on the display unit. Alternatively, as illustrated in FIG. 14, in the case of a document file including separate tabs such as an Excel file, when a screen capturing command is input in a tab, information associated with a tab area of the corresponding file may be extracted.

Subsequently, the first mobile terminal may transmit the captured image to a second mobile terminal. When a user command such as a selection command for the received captured image and the like is input, a controller of the second terminal connects to the first mobile terminal based on the local link information included in the captured image and executes the corresponding document file. In this example, when the captured image includes the information associated with the document area displayed on the display unit or information associated with the tab area of the file, the controller of the second mobile terminal performs controlling to execute the corresponding document file, and to display the corresponding document area of the document.

Figure 15A:
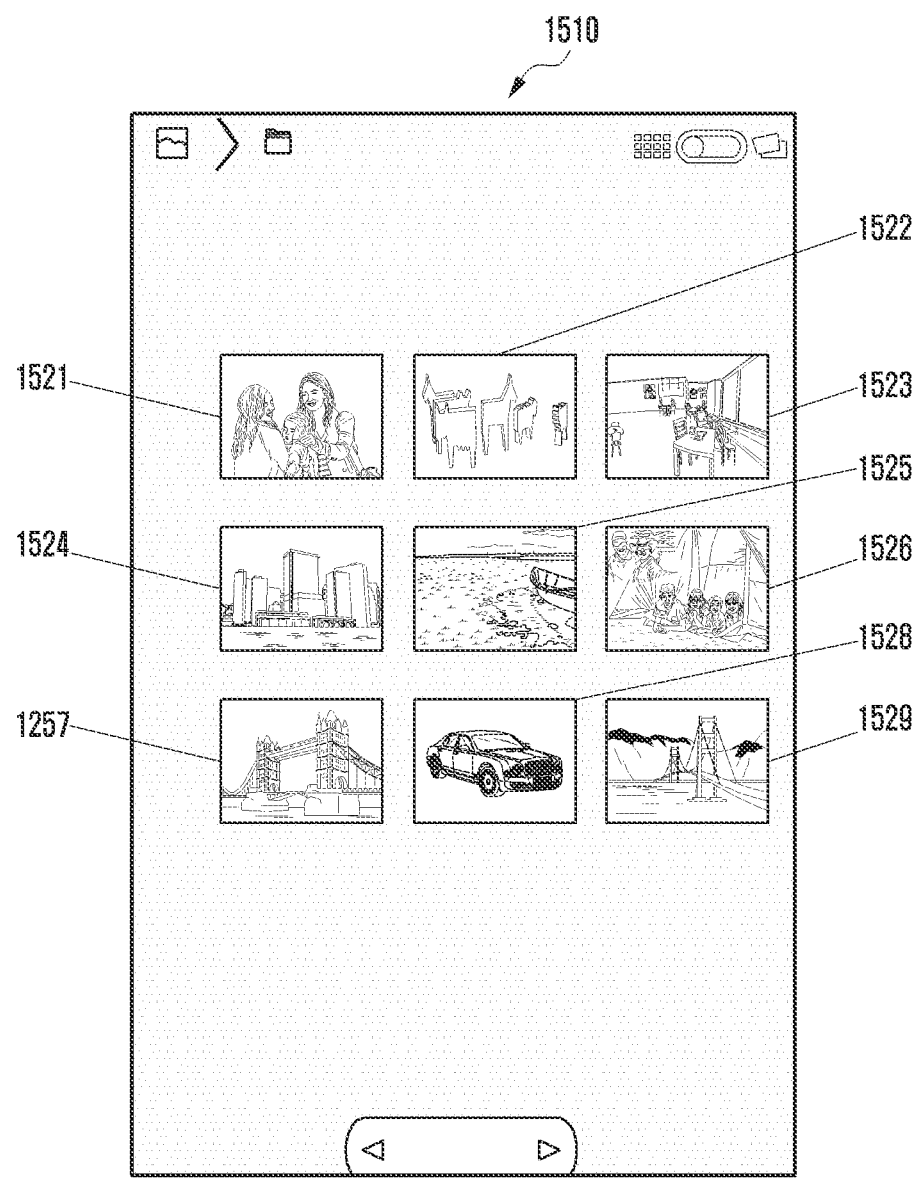
Figure 15B:
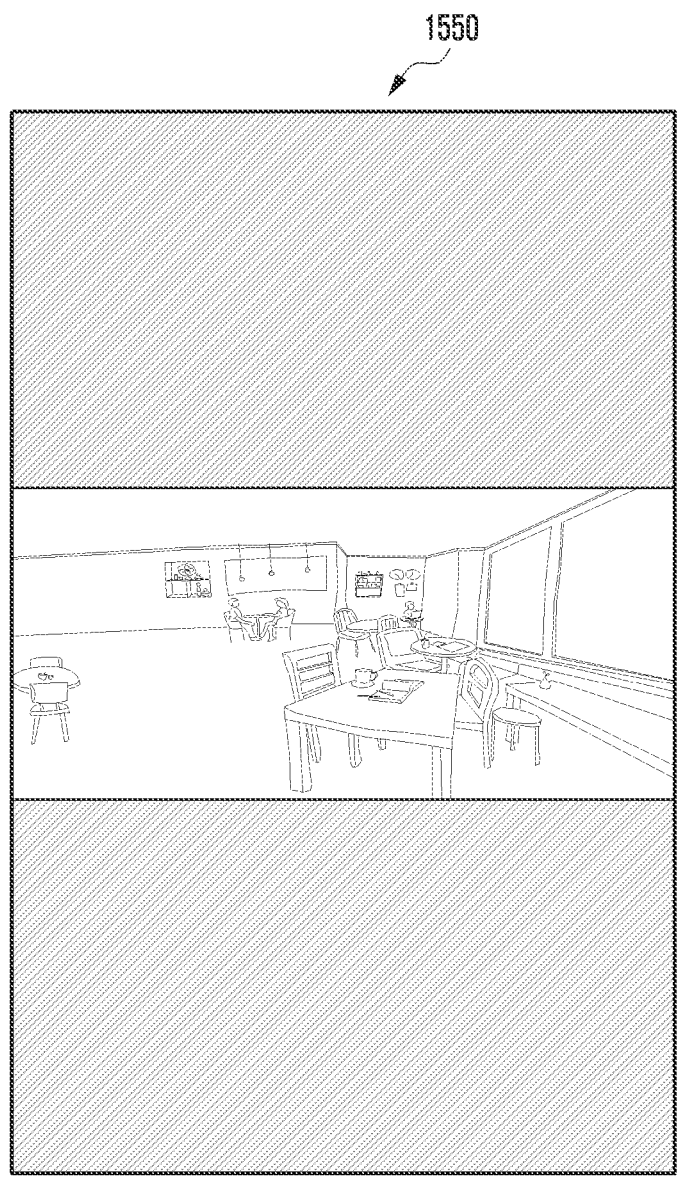

FIGS. 15A and 15B are diagrams illustrating a case in which a screen capturing command is input while a gallery application is played back according to an embodiment of the present disclosure.

Referring to FIG. 15A, a screen capturing command is input while a gallery application that displays a picture stored in a mobile terminal 1510 is executed. In this example, the controller may extract local link information of each picture displayed in a gallery as an supplementary information. That is, in FIG. 15A, when a screen capturing command is input while nine pictures 1521 through 1529 are displayed in the gallery, the controller may extract local link information of each picture 1521 through 1529.

Also, the extracted local link information of each picture 1521 through 1529 may be stored by being linked to a location corresponding to each picture 1521 through 1529 when a captured image is generated. That is, the local link information of the first picture 1521 may be linked to an area where the first picture is stored in a captured screen, and may be stored as the captured image.

Subsequently, the first mobile terminal may transmit the captured image to a second mobile terminal. When a user command such as a selection command for the received captured image and the like is input, as illustrated in FIG. 15B, a controller of the second terminal connects to the first mobile terminal based on the local link information included in the captured image and views the corresponding picture 1550. For example, when a command for selecting an area corresponding to the third picture 1523 from among the first through ninth pictures included in the captured image is input, the controller may perform controlling to connect to the first mobile terminal based on the local link information of the third picture and to display the selected third picture as illustrated in FIG. 15B.

To enable the second mobile terminal to access the first mobile terminal and to execute a corresponding process based on local link information, access right information for local data of the first mobile terminal needs to be provided to the second mobile terminal. That is, a user of the first terminal does not allow an undesirable third party to access his/her mobile terminal so as not to allow the execution of local data, and desires to allow only a user of a second mobile terminal to access local data. To this end, the access right that allows access to the first mobile terminal may need to be assigned to the second mobile terminal Access of third party who does not have access right may be blocked and thus, privacy of a user of a terminal may be protected.

In this example, the access right information associated with the local data may be included in the captured image. For example, an indicator indicating that only a terminal is allowed to access local data may be included in the captured image. Subsequently, when the second mobile terminal that receives captured image selects the captured image and attempts access to the local area of the first mobile terminal, the indicator is checked and the access of the second mobile terminal may be blocked when the second mobile terminal is different from a terminal that is allowed to access the local data of the first mobile terminal.

Depending on the various embodiments, the access right information associated with the local data may be formed of an IDentification (ID) and a password. For example, the first mobile terminal may set an ID and a password for allowing access to the terminal. When the second mobile terminal receives the captured image including a local link and attempts access to the local link of the first mobile terminal, the second mobile terminal may be required to input an ID and a password, and access to the local link may be allowed only when the ID and the password are identified.

Also, depending on the various embodiments, the access right information for the local data may be transmitted in a manner that the first mobile terminal uplinks the information to a cloud and the second mobile terminal downloads the information from the cloud. Alternatively, the first mobile terminal may transmit the access right information for the local data to the second mobile terminal using a communication scheme such as a Bluetooth communication scheme and the like.

Also, according to an embodiment of the present disclosure, the described method may be embodied through a computer-readable code in a recording medium in which a program is recorded. The computer-readable medium includes all the types of recording devices in which data readable by a computer system are stored. Examples of the computer-readable medium includes a ROM, a RAM, a CD-ROM, a magnetic tape, a floppy disk, an optical data storage device, and the like, and includes a medium embodied in a form of a carrier wave (for example, transmission through the Internet). Also, the computer may include the controller 180 of the terminal.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method of controlling a mobile terminal including a display, the method comprising:
    capturing a screen including content which is included in a web page;
    extracting supplementary information associated with the content displayed on the display, wherein the supplementary information includes a location identifier associated with the content and content marker information associated with the content;
    storing an icon corresponding to the extracted supplementary information together with the captured screen as a captured image; and
    displaying an area including the content in the web page when the icon is selected,
    wherein the content marker information comprises information associated with a location of the area including the content in the web page.

2. The method of claim 1, wherein the captured image further comprises:
    identification information indicating that the extracted supplementary information is included.

3. The method of claim 1, wherein the extracting of the supplementary information comprises:
    determining whether extractable supplementary information associated with the process exists; and
    extracting the extractable supplementary information when the extractable supplementary information exists.

4. The method of claim 1, further comprising:
    modifying the captured screen.

5. The method of claim 1, wherein the location identifier includes a Uniform Resource Locator (URL) associated with the content.

6. The method of claim 5,
    wherein the content includes a plurality of content elements displayed on the display, and
    wherein the extracted supplementary information includes a plurality of URLs respectively corresponding to each of the plurality of content elements.

7. The method of claim 6, wherein the storing of the icon corresponding to the extracted supplementary information together with the captured screen, as the captured image comprises:
    storing the plurality of URLs in the captured image,
    wherein each of the plurality of URLs corresponds to a different area of the captured screen.

8. The method of claim 5,
    wherein the content marker information further comprises time information associated with a video displayed on the display, and
    wherein the captured image is displayed on another mobile terminal based on the content marker information.

9. The method of claim 1,
    wherein the supplementary information further includes a local link associated with the content, and
    wherein the local link corresponds to a stored location of the content.

10. The method of claim 9, wherein the extracted supplementary information further comprises access right information associated with the content.

11. The method of claim 1, further comprising:
    transmitting the stored captured image to another mobile terminal.

12. A mobile terminal comprising:
    a display;
    a memory; and
    at least one processor configured to:
        capture a screen including content which is included in a web page,
        extract supplementary information associated with the content displayed on the display, wherein the supplementary information includes a location identifier associated with the content and content marker information associated with the content,
        store, in the memory, an icon corresponding to the extracted supplementary information together with the captured screen as a captured image, and
        display an area including the content in the web page when the icon is selected,
    wherein the content marker information comprises information associated with a location of the area including the content in the web page.

13. The mobile terminal of claim 12, wherein the captured image further comprises:
    identification information indicating that the extracted supplementary information is included.

14. The mobile terminal of claim 12, wherein the at least one processor is further configured to:
    determine whether extractable supplementary information associated with the process exists, and
    extract the extractable supplementary information when the extractable supplementary information exists.

15. The mobile terminal of claim 12, wherein the at least one processor is further configured to modify the captured screen.

16. The mobile terminal of claim 12, wherein the location identifier includes a Uniform Resource Locator (URL) associated with the content.

17. The mobile terminal of claim 16,
    wherein the content includes a plurality of content elements displayed on the display, and
    wherein the extracted supplementary information comprises a plurality of URLs respectively corresponding to each of the plurality of content elements.

18. The mobile terminal of claim 17,
    wherein the at least one processor is further configured to store the plurality of URLs in the captured image, and
    wherein each of the plurality of URLs corresponds to a different area of the captured screen.

19. The mobile terminal of claim 16,
    wherein the content marker information further comprises time information associated with a video displayed on the display, and
    wherein the captured image is displayed on another mobile terminal based on the content marker information.

20. The mobile terminal of claim 12,
    wherein the extracted supplementary information further includes a local link associated with the content, and
    wherein the local link corresponds to a stored location of the content.

* * * * *